United States Patent [19]
Kondo

[11] Patent Number: 5,926,212
[45] Date of Patent: Jul. 20, 1999

[54] IMAGE SIGNAL PROCESSING APPARATUS AND RECORDING/REPRODUCING APPARATUS

[75] Inventor: Tetsujiro Kondo, Kanagawa, Japan

[73] Assignee: Sony Corporation, Japan

[21] Appl. No.: 09/113,329

[22] Filed: Jul. 10, 1998

Related U.S. Application Data

[62] Division of application No. 08/698,860, Aug. 16, 1996, Pat. No. 5,835,138.

[30] Foreign Application Priority Data

Aug. 30, 1995 [JP] Japan .............................. P07-245430
Jun. 13, 1996 [JP] Japan .............................. P08-174116

[51] Int. Cl.$^6$ .................................................. H04N 5/228
[52] U.S. Cl. ........................ 348/208; 348/699; 348/700
[58] Field of Search .................................. 348/208, 699, 348/700; 396/52, 53, 54; 382/103, 241, 243; H04N 5/228

[56] References Cited

U.S. PATENT DOCUMENTS

| | | | |
|---|---|---|---|
| 5,184,216 | 2/1993 | Kobayashi | 348/208 |
| 5,259,040 | 11/1993 | Hanna | 382/41 |
| 5,282,044 | 1/1994 | Misawa et al. | 348/208 |
| 5,296,925 | 3/1994 | Kondo et al. | 348/208 |
| 5,430,479 | 7/1995 | Takahama et al. | 348/208 |
| 5,497,191 | 3/1996 | Yoo et al. | 348/208 |
| 5,614,945 | 3/1997 | Sekine et al. | 348/208 |
| 5,727,115 | 3/1998 | Wada | 348/208 |
| 5,748,231 | 5/1998 | Park et al. | 348/208 |

FOREIGN PATENT DOCUMENTS

B-797754 10/1995 Japan .

OTHER PUBLICATIONS

Yi Tong Tse et al: "Global Zoom/Pan Estimation and Compensation for Video Compression" Multidimensional Signal Processing, Toronto, May 14–17, 1991, vol. 4, no. CONF. 16, 14 May 1991, pp. 2725–2728, EXP000453526 Institute of Electrical and Electronics Engineers.

*Primary Examiner*—Bryan Tung
*Assistant Examiner*—Nhon T. Diep
*Attorney, Agent, or Firm*—Rader, Fishman & Grauer; Ronald P. Kananen

[57] ABSTRACT

An interframe difference Pij and a motion vector Vhv are supplied to a camera shake detecting circuit from a motion vector detecting circuit. A camera shake detecting circuit integrates the interframe difference and forms an evaluation value ΣPhv. When all blocks of one picture plane satisfy (Vhv<TH1 and ΣPhv>TH2) for TH1 and TH2, the camera shake detecting circuit detects a camera shake. The motion vector of each block is divided into macroblocks and converted into a motion vector of each macroblock. A camera shake motion vector of the whole picture plane is formed from the motion vector of each macroblock. A correction signal is formed from the detected camera shake motion vector. A camera shake correcting process is executed by the correction signal.

10 Claims, 18 Drawing Sheets

Fig. 12

SEARCH AREA

| | i = 0 | 1 | 2 | 3 | 4 | 5 | 6 | 7 | 8 |
|---|---|---|---|---|---|---|---|---|---|
| j = 0 | P00 | P10 | P20 | P30 | P40 | P50 | P60 | P70 | P80 |
| 1 | P01 | | | | | | | | |
| 2 | P02 | | | | P42 | | | | |
| 3 | P03 | | | P33 | P43 | P53 | | | |
| 4 | P04 | | | | P44 | | | | |
| 5 | P05 | | | | | | | | |
| 6 | P06 | P16 | P26 | · | · | · | · | · | P86 |

Fig. 13

| | h = 0 | 1 | · · · · · · · · · · · | 43 |
|---|---|---|---|---|
| v = 0 | ΣP00 | ΣP10 | | ΣP430 |
| 1 | ΣP01 | | | ΣP431 |
| 2 | ΣP02 | | | ΣP432 |
| ⋮ | | | | |
| 29 | ΣP029 | ΣP129 | | ΣP4329 |

16

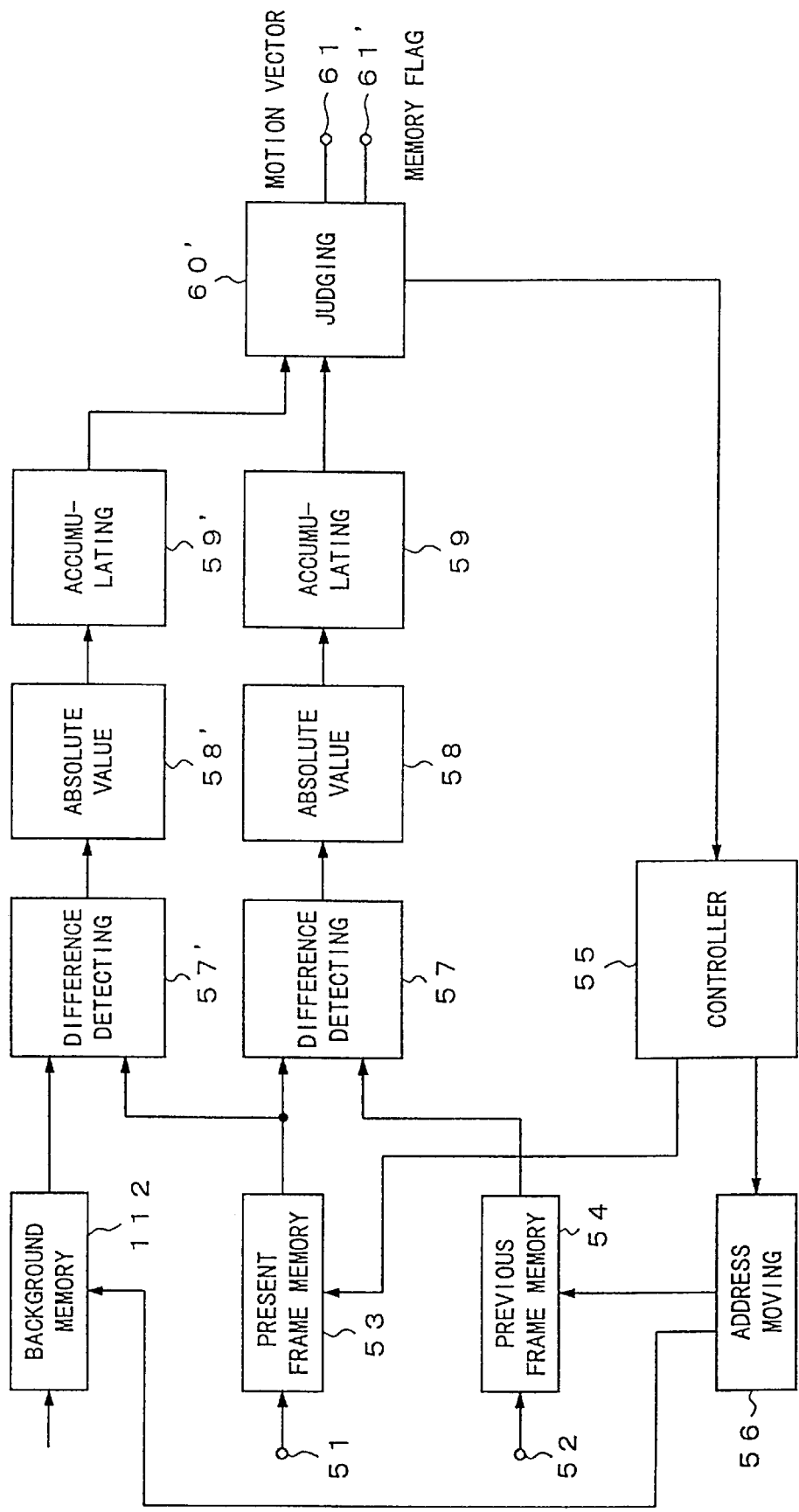

IMAGE SIGNAL PROCESSING APPARATUS AND RECORDING/REPRODUCING APPARATUS

This application is a divisional of application Ser. No. 08/698,860 filed Aug. 16, 1996, now U.S. Pat. No. 5,835,138.

BACKGROUND OF THE INVENTION

1. Field of the Invention

The invention relates to an image signal processing apparatus for compressing image data such as a photographing output of a video camera of a handy type or the like, an image signal recording apparatus for recording compression image data to a recording medium, and an image signal reproducing apparatus for reproducing the compression image data from the recording medium and, more particularly, to a correction of a camera shake of a video camera.

2. Description of the Related Art

When photographing by using a video camera of a handy type, there is a problem such that a reproduction picture plane is shaken due to a camera shake. To solve the problem, there is considered a method whereby a motion vector is detected and image data stored in an image memory is corrected on the basis of the motion vector. The detection of the motion vector is performed by, for example, a block matching. That is, the picture plane is divided into a number of areas (referred to as blocks), an absolute value of a frame difference between a representative point of a previous frame which is located at the center of each block and pixel data in the block of the present frame is arithmetically operated and the absolute value of the frame difference is integrated with respect to one picture plane, thereby detecting the motion vector of the whole picture plane from the position of the minimum value of integration frame difference data obtained. The detected motion vector is converted into a correction signal and a correction to move an original image is performed by the correction signal.

For example, in FIG. 1A, a picture frame La shown by a broken line is a picked-up image and its position is corrected to a picture frame Lb shown by a broken line by a camera shake correction. In the image in the picture frame Lb after completion of the correction, since there is no pickup image in the area shown by a hatched portion, a drop-out of images occurs. As one method of solving the problem, there is a method of enlarging the picture frame to some degree as shown by Lc in FIG. 1B. Thus, it is possible to prevent the drop-out of images.

However, the enlargement of the image makes a reading speed of the image memory slower than a writing speed of the memory and is performed by a process of interpolating lacking pixel data. Therefore, a resolution of the enlarged image deteriorates as compared with that of the original image. Thus, there is a problem such that a picture quality after completion of the camera shake correction is not good.

Other problems in the conventional camera shake correction will now be described hereinbelow. This is a problem such that a motion of a large area in the picture plane is erroneously discriminated as a camera shake. When using a method of dividing one picture plane into (4×4=16) macroblocks and detecting a motion vector in each macroblock, for example, as shown in FIG. 2A, when a person moves in the direction from the right to the left in the picture plane, the motion vector shown by an arrow is detected in each block. The motion vectors in the other blocks in which no person (edge) is included are detected as 0.

Hitherto, the motion vector of each macroblock is discriminated by using a decision by the majority and the motion vectors as major vectors are used as motion vectors for the camera shake correction. As in the conventional apparatus mentioned above, however, when an object having a large area exists at the center of the picture plane and the object moves, there is a possibility such that the movement of the object is erroneously discriminated as a camera shake. It is, consequently, necessary to avoid such an error discrimination.

Further, there is also a case where a plurality of motion vectors exist as motion vectors of the macroblocks. For example, as shown in FIG. 2B, the motion vectors corresponding to the motion which occurred due to the camera shake and motion vectors which occurred due to the motion of the object in the picture plane are synthesized, so that a plurality of motion vectors are detected. Like an example of FIG. 2B, there is a problem such that in a state in which there is a motion of the object having a large area, when the majority decision is performed as in the conventional apparatus, the motion vector due to the camera shake cannot be correctly detected.

Further, in an image signal recording apparatus such as a VTR of a video camera integrated type, it is general to record a signal which was subjected to a camera shake correction as an image signal to be recorded. Thus, however, the photographed image itself cannot be reproduced and, when the camera shake is not preferably corrected, there is a problem such that the correction is impossible on the reproducing side.

As mentioned above, the conventional method of detecting the motion vector and correcting a camera shake on the basis of the detected motion vectors has various problems. Further, in addition to the above-mentioned problems, there is a problem such that a hardware to detect the motion vectors is necessary and a scale of the hardware for the camera shake correction increases.

OBJECT AND SUMMARY OF THE INVENTION

The invention intends to reduce a scale of a hardware. Ordinarily, when digital image data is recorded to a recording medium (a magnetic tape, an optical disc, or the like), a motion compensation predictive encoding has been known as a high-efficient encoding to compress an amount of recording data. According to such an encoding, a difference between an input image signal and a prediction image signal is detected, the difference is encoded, further, in the predictive encoding for variable length encoding, when forming a predictive signal, a motion compensation by a motion vector detected is performed, thereby reducing a difference value. Since the motion vector is used in order to correct the camera shake of the video camera, the motion vector detected for motion compensation predictive encoding is used as a motion vector, so that a hardware to detect the motion vector can be commonly used.

It is, therefore, an object of the invention to provide an image signal processing apparatus and a recording/reproducing apparatus, in which a motion vector detected for motion compensation predictive encoding can be also commonly used to correct a camera shake.

According to the invention, there is provided an image signal processing apparatus having functions for dividing image data of one picture plane into a plurality of blocks, detecting a motion vector corresponding to a position of the block which most coincides from the image data of one or a few frames before with respect to each block, and compressing the image data by using the motion vector, comprising: a unit for detecting the motion vector of each block; a unit for detecting a camera shake motion vector from the motion vector of each block; a unit for correcting an input image signal on the basis of the camera shake motion vector; a unit for obtaining the motion vector in which the motion vector of each block has been corrected by the camera shake motion vector; a unit for performing a motion compensation by the corrected motion vector; and a unit for performing a compressing process by the image data which was camera shake corrected and the image data which was motion compensated.

According to the invention, there is provided an image signal recording apparatus having functions for dividing image data of one picture plane into a plurality of blocks, detecting a motion vector corresponding to a position of the block which most coincides from image data of one or a few frames before with respect to each block, and compressing the image data by using the motion vector, comprising: a unit for detecting a motion vector of each block; a unit for detecting a camera shake motion vector from the motion vector of each block; a unit for performing a motion compensation by the motion vector; a unit for performing a compressing process by input image data and the image data which was motion compensated; and a unit for recording the camera shake motion vector together with the compressed image data.

Further, according to the invention, there is provided an image signal reproducing apparatus for dividing image data of one picture plane into a plurality of blocks, detecting a motion vector corresponding to a position of the block which most coincides from the image data of one or a few frames before with respect to each block, compressing the image data by using the motion vector, detecting a camera shake motion vector from the motion vector, performing a motion compensation by the motion vector, executing a compressing process by input image data and the image data which was motion compensated, and reproducing a recording medium in which the camera shake motion vector has been recorded together with the compressed image signal, comprising: a decoding unit for decoding the compressed image data; a unit for separating the camera shake motion vector from a reproduction signal; and a unit to which a decoded image signal from the decoding unit is supplied and which executes a camera shake correction by the camera shake motion vector.

Like a motion compensation predictive encoding, in order to compress the recording data, a motion vector is detected. The motion vector is detected on a block unit basis. By using the motion vector and a change amount of the image data, the camera shake motion vector is detected. The image data which was corrected by the camera shake motion vector is recorded. Not only the camera shake corrected image data is recorded but also the camera shake motion vector or the correction signal formed by such a vector is recorded to the recording medium together with the compression image data, and the camera shake correction is executed upon reproduction.

The above and other objects and features of the present invention will become apparent from the following detailed description and the appended claims with reference to the accompanying drawings.

BRIEF DESCRIPTION OF THE DRAWINGS

FIG. 12 is a schematic diagram which is used in an explanation of a detecting process of a camera shake motion vector;

FIG. 13 is a schematic diagram which is used in an explanation of the detecting process of the camera shake motion vector;

FIG. 24 is a block diagram showing a construction of an example of the motion vector detecting circuit in further another embodiment of the invention.

DETAILED DESCRIPTION OF THE PREFERRED EMBODIMENTS

An embodiment of the invention will now be described hereinbelow with reference to the drawings. As an embodiment, for example, a video camera of a VTR integrated type is used, a photographed image signal is converted to a digital signal and is compressed by a motion compensation predictive encoding and is recorded to a recording medium such a magnetic tape or the like.

Figure 1A:
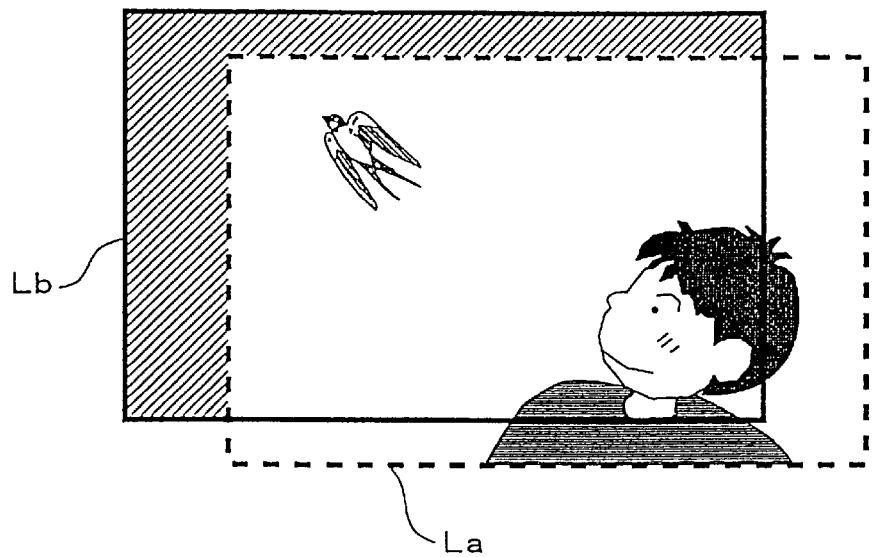
FIGS. 1A and 1B are schematic diagrams for explaining a conventional camera shake correcting process.
Figure 1B:
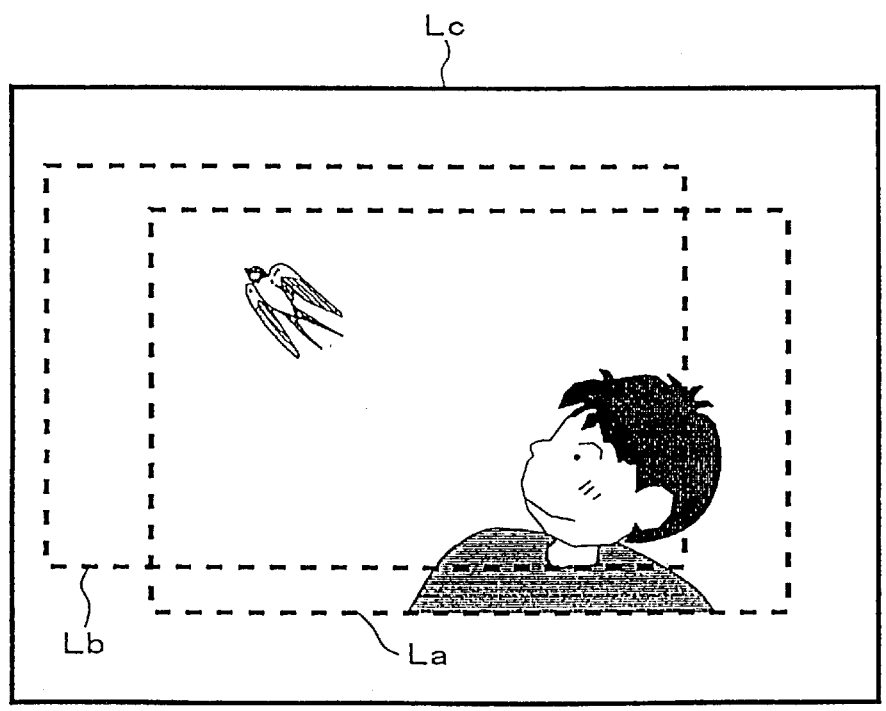
Figure 2A:
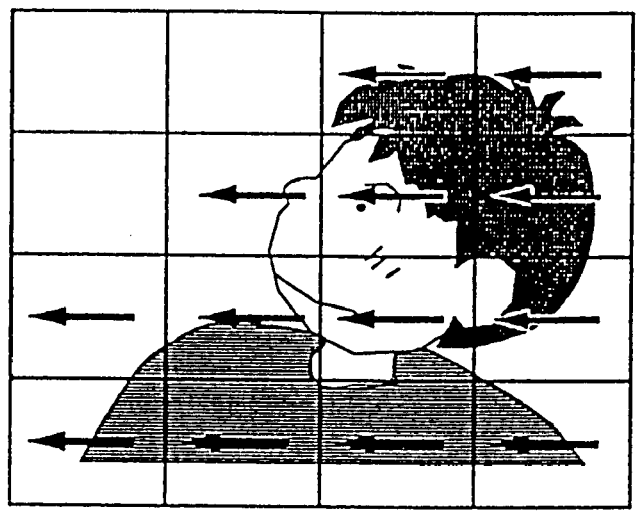
FIGS. 2A and 2B are schematic diagrams for explaining the conventional camera shake correcting process.
Figure 2B:
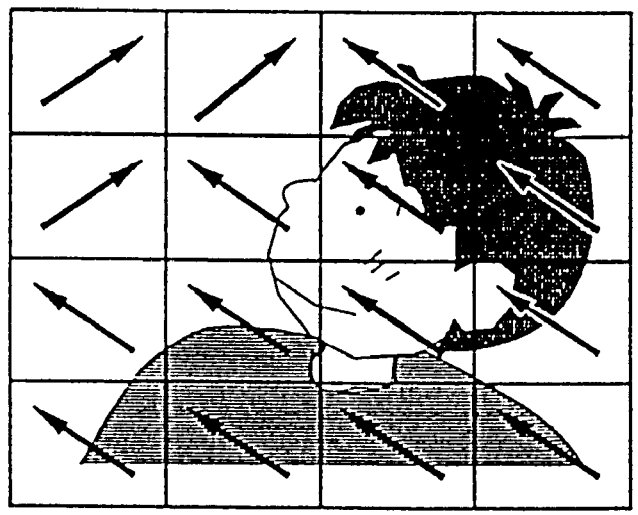
Figure 3:
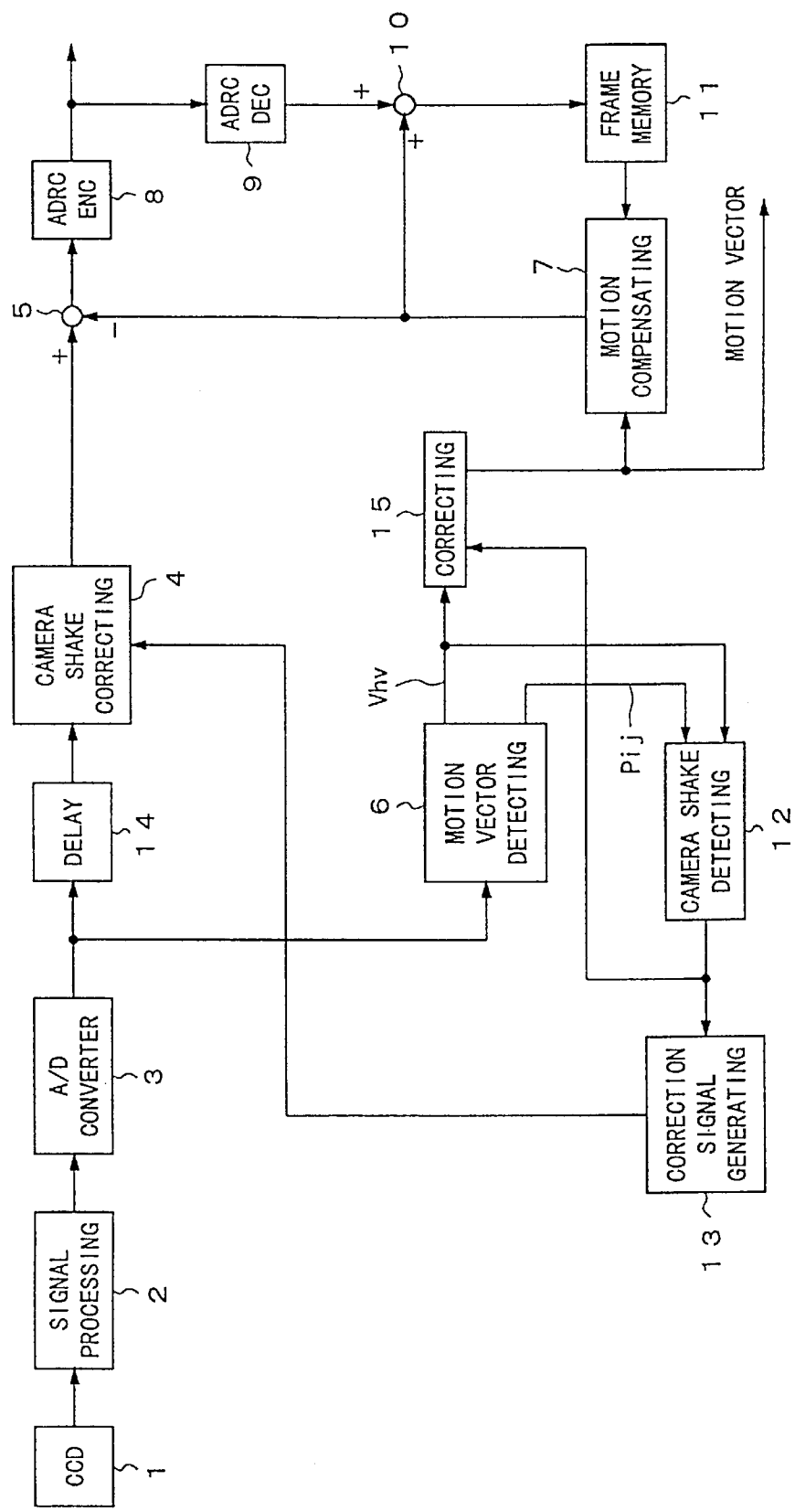
FIG. 3 is a block diagram of an embodiment of the invention.

In FIG. 3, reference numeral 1 denotes a CCD as an image pickup device. An image pickup output of the CCD 1 is supplied to a camera signal processing circuit 2 and is converted into a video signal. The video signal is converted into a digital video signal by an A/D converter 3. The video signal is A/D converted by a sampling frequency of, for example, 13.5 MHz. Although the invention can be also applied to a component signal constructed by a luminance signal and two color difference signals or a composite signal in which a luminance signal and a carrier chrominance signal have been superimposed, in order to simplify the explanation, only a process of the luminance signal will now be described in the following description.

The digital video signal from the A/D converter 3 is supplied through a delay circuit 14 to a camera shake correcting circuit 4 to which the invention is applied. As will be described hereinafter, the camera shake correcting circuit 4 is a circuit for correcting a camera shake upon photographing. A camera shake detecting circuit 12 and a correction signal generating circuit 13 are provided for the camera shake correction. The delay circuit 14 is provided for a phase adjustment to delay the digital video signal for a period of time which is required for a process to form a camera correction signal. An output signal of the camera shake correcting circuit 4 is supplied to a subtracting circuit 5. An output signal of the A/D converter 3 is supplied to a motion vector detecting circuit 6.

A prediction signal from a motion compensating circuit 7 is supplied to the subtracting circuit 5. A difference between the actual video signal and the prediction signal occurs every pixel from the subtracting circuit 5. The difference is supplied to an encoder 8 for ADRC encoding and an encoded output of the encoder 8 is extracted. An output of the encoder 8 is supplied to an ADRC decoder (local decoder) 9, so that decoded data of a difference value is extracted as an output of the ADRC decoder 9. It is also possible to perform a refreshing process by the decoding side by periodically inserting an image signal of an intraframe encoding.

The decoded value from the ADRC decoder 9 is supplied to an adding circuit 10 and is added to the prediction signal from the motion compensating circuit 7. The decoded signal obtained from the adding circuit 10 is written into a frame memory 11. An output of the frame memory 11 is supplied to the motion compensating circuit 7. A motion vector Vhv from the motion vector detecting circuit 6 is supplied to the motion compensating circuit 7 through a motion vector correcting circuit 15, thereby performing a motion compensation. The prediction signal from the motion compensating circuit 7 is supplied to the adding circuit 10 and is also supplied to the subtracting circuit 5. In the subtracting circuit 5, a difference between the pixels of the actual video signal and the prediction signal is formed.

The motion vector detecting circuit 6 detects a motion vector for motion compensation from the output video signal of the A/D converter 3, namely, the digital video signal before the camera shake correction. In the embodiment of the invention, the motion vector Vhv and an evaluation value Pij are supplied to the camera shake detecting circuit 12 and, as will be described hereinlater, a camera shake motion vector is obtained and is supplied to the correction signal generating circuit 13, thereby forming a correction signal. The correction signal is supplied to the camera shake correcting circuit 4, so that the camera shake can be corrected.

Figure 4:
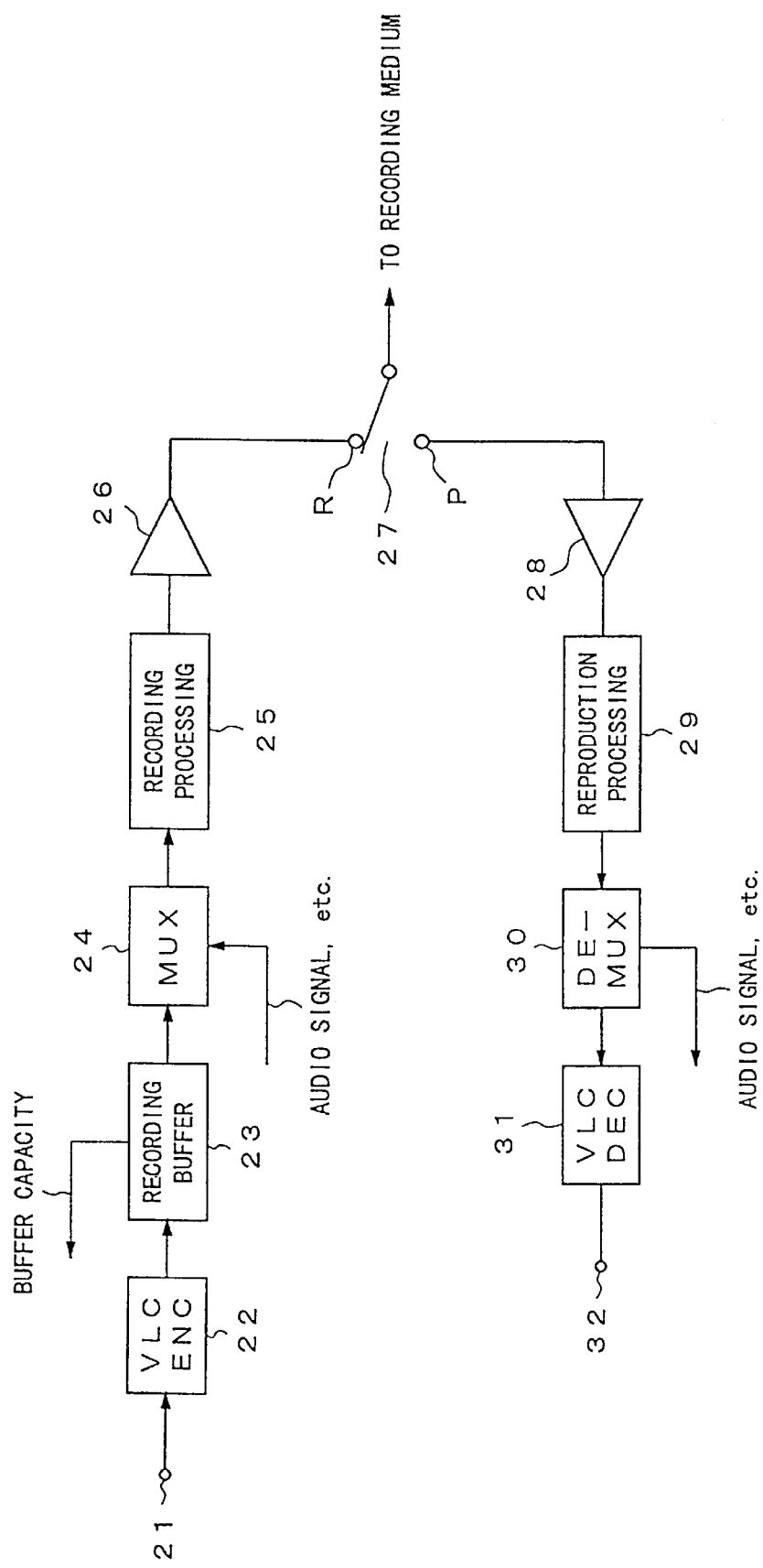
FIG. 4 is a block diagram showing constructions of a recording system and a reproducing system in the embodiment of the invention.

In order to record and reproduce the image signal, a construction shown in FIG. 4 is used. In FIG. 4, an encoded output is supplied from the encoder (in the example of FIG. 3, ADRC encoder 8) for motion compensation predictive encoding to an input terminal designated by reference numeral 21. The encoded output is supplied to an encoder 22 for variable length encoding and is variable length encoded. The variable length encoded output is supplied to a recording buffer 23. The recording buffer 23 feeds back a signal indicative of a buffer amount to the front stage. Thus, an amount of recording data for a predetermined period of time is controlled to a predetermined value. For example, an amount of transmission data can be controlled by changing the number of quantization bits of the ADRC encoding.

Although the buffering circuit of the feed-back control is used in the example, it is also possible to construct in a manner such that a plurality of bits (for example, zero bit, one bit, two bits, three bits, four bits) are prepared as the number of quantization bits in the ADRC encoding, and a buffering of a feed-forward control such that an amount of generation data for a predetermined period of time is estimated, and the number of quantization bits is selected every block so as not to exceed a target data amount is executed. An output of the recording buffer 23 is supplied to a multiplexer 24 and audio data, data for control, and the like are multiplexed.

An output of the multiplexer 24 is supplied to a recording processing circuit 25. Processes such as error correction encoding, channel modulation, and the like for the recording data are performed in the recording processing circuit 25. The recording data from the recording processing circuit 25 is recorded to a recording medium through a recording amplifier 26 and a recording side terminal R of a recording/reproduction change-over switch 27. As a recording medium, a magnetic tape, a recordable optical disc, or the like can be used.

Reproduction data reproduced from the recording medium is supplied to a reproduction processing circuit 29 through a reproducing side terminal P of the recording/reproduction change-over switch 27 and a reproducing amplifier 28. The reproduction processing circuit 29 performs processes such as demodulation of the channel modulation, error correction, and the like. An output of the reproduction processing circuit 29 is supplied to a demultiplexer 30 and an audio signal, data for control, and the like are separated. Reproduction data corresponding to a video signal from the demultiplexer 30 is supplied to a decoder 31 of the variable length encoding, so that the variable length encoded data is decoded. The reproduction data extracted to an output terminal 32 is supplied to a decoder of a high efficient encoding such as an ADRC decoder or the like.

Figure 5:
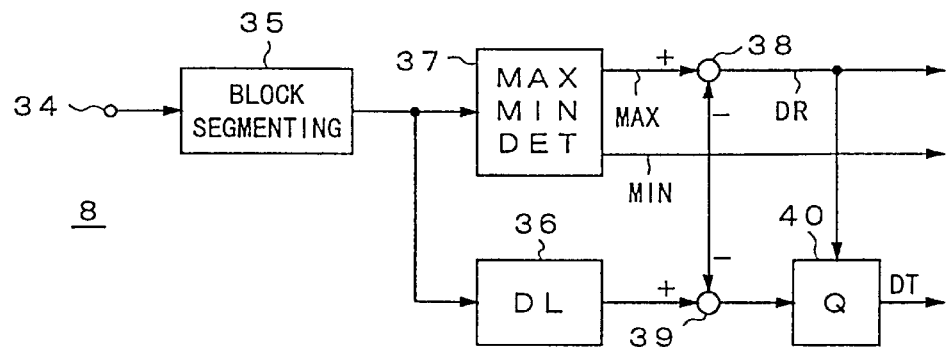
FIG. 5 is a block diagram of an ADRC encoder in the embodiment of the invention.

The ADRC is one of the high efficiency encoding methods proposed by the inventors et al. of the present invention. An example of a construction of the ADRC encoder 8 is shown in FIG. 5. A digital video signal is supplied from an input terminal 34 to a block segmenting circuit 35. Data having the order of every block obtained by segmenting one picture plane is formed by the block segmenting circuit 35. Output data of the block segmenting circuit 35 is supplied to a detecting circuit 36 and a delay circuit 37.

The detecting circuit 36 detects a maximum value MAX and a minimum value MIN of a plurality of pixels of each block. The delay circuit 37 delays the digital video signal by a time which is required for such detection. The detected maximum value MAX and minimum value MIN are supplied to a subtracting circuit 38 and a dynamic range DR shown by (MAX−MIN=DR) is obtained from the subtracting circuit 38. The digital video signal from the delay circuit 37 and the minimum value MIN are supplied to a subtracting circuit 39, so that corrected pixel data in which the minimum value has been eliminated is obtained as an output of the subtracting circuit 39. A normalization is performed by eliminating the minimum value MIN which is shared by the pixels in the block.

Figure 7:
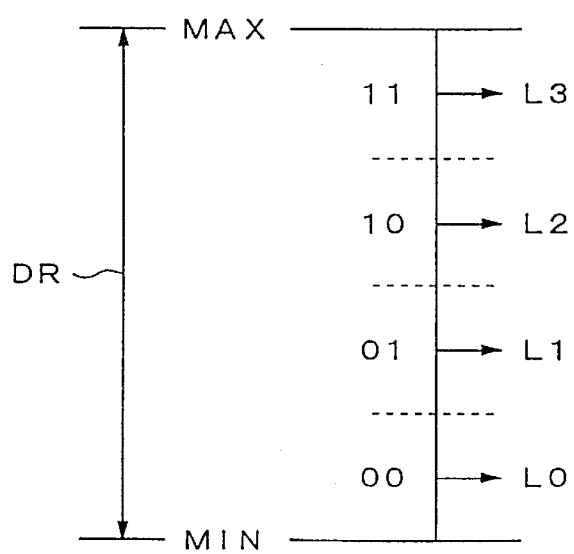
FIG. 7 is a schematic diagram showing an ADRC encoding process.

An output of the subtracting circuit 39 and the detected dynamic range DR are supplied to a quantizing circuit 40. In the quantizing circuit 40, as shown in FIG. 7, the output of the subtracting circuit 39 is again quantized by a quantizing step of dividing the dynamic range DR into $2^n$ equal parts (n: the number of quantization bits and n=2 in FIG. 7). Since the pixels which are spatially neighboring have a strong correlation, even if the number of quantization bits n is set to be smaller than the original number of quantization bits (for example, 8 bits), a deterioration in decoded image is small, so that the transmission data amount can be compressed. An encoded output DT from the quantizing circuit 40 is transmitted and the dynamic range DR of every block and the minimum value MIN are transmitted as additional information.

Figure 6:
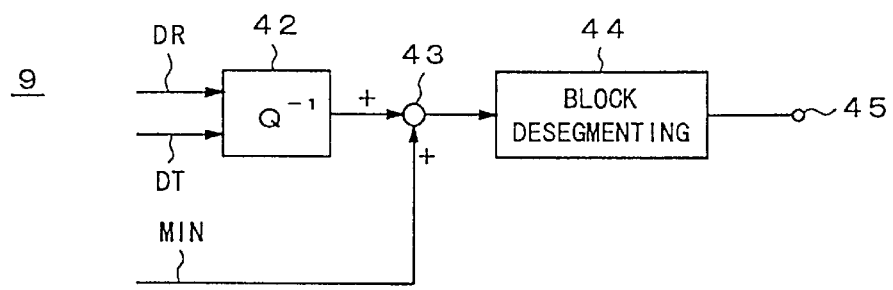
FIG. 6 is a block diagram of an ADRC decoder.

FIG. 6 shows a construction of an example of the ADRC decoder 9. The dynamic range DR and encoded output DT from the ADRC encoder 8 are supplied to an inverse quantizing circuit 42. The inverse quantizing circuit 42 multiplies a quantizing step determined by the dynamic range DR and the number (n) of quantization bits to the encoded output and rounds a multiplexed output to an integer, thereby generating reconstructing levels. As shown in FIG. 7, medians within the ranges of the levels upon quantization are set to reconstructing levels (representative levels) L0, L1, L2, and L3.

The reconstructing level from the inverse quantizing circuit 42 and the minimum value MIN are added by an adding circuit 43, thereby obtaining a decoded value. The decoded value is supplied to a block desegmenting circuit 44 and the order of pixel data is returned to a raster order. A decoded video signal is extracted to an output terminal 45 of the block desegmenting circuit 45.

Figure 8:
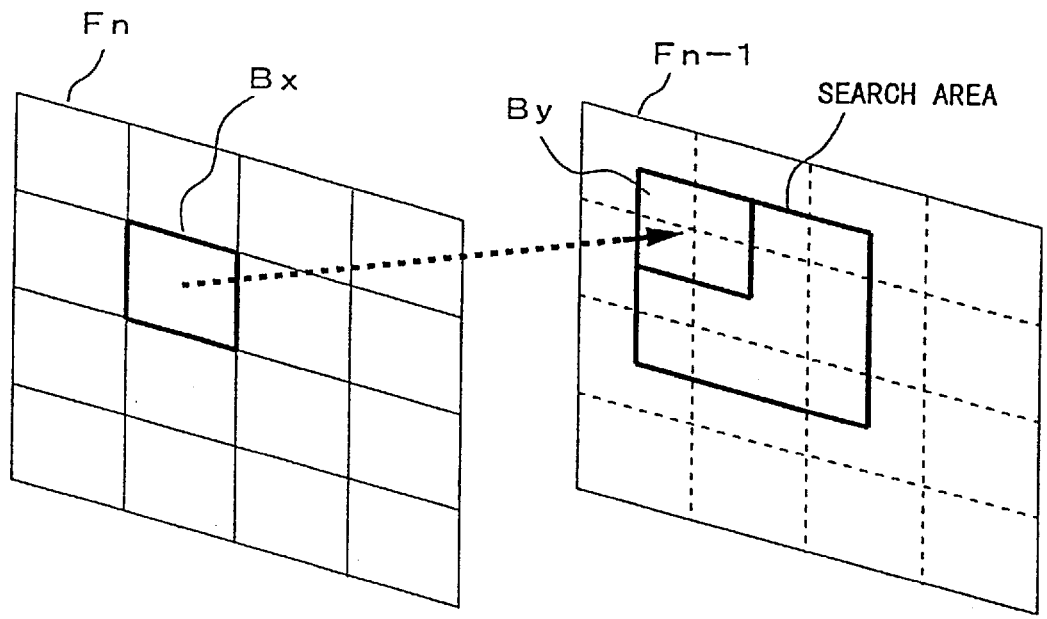
FIG. 8 is a schematic diagram for schematically explaining a motion vector detection.

The motion vector is detected by a block matching method in the motion vector detecting circuit 6. Such a detecting process is as schematically shown in FIG. 8. A check block By of a reference frame, for example, a previous frame Fn−1 is moved within a predetermined search area and a check block which most coincides with a reference block Bx of a present frame Fn is detected, thereby obtaining the motion vector. Therefore, the motion vector is obtained every block. As an evaluation value indicative of a degree of coincidence, between a plurality of pixels in the reference block Bx and a plurality of pixels in the check block By, a subtraction is performed between the values of the pixels at the same spatial position, thereby obtaining frame differences. A sum of the absolute values of the frame differences can be used. A sum of the squares of the frame differences can be also used in place of the sum of the absolute values of the frame differences.

Figure 9:
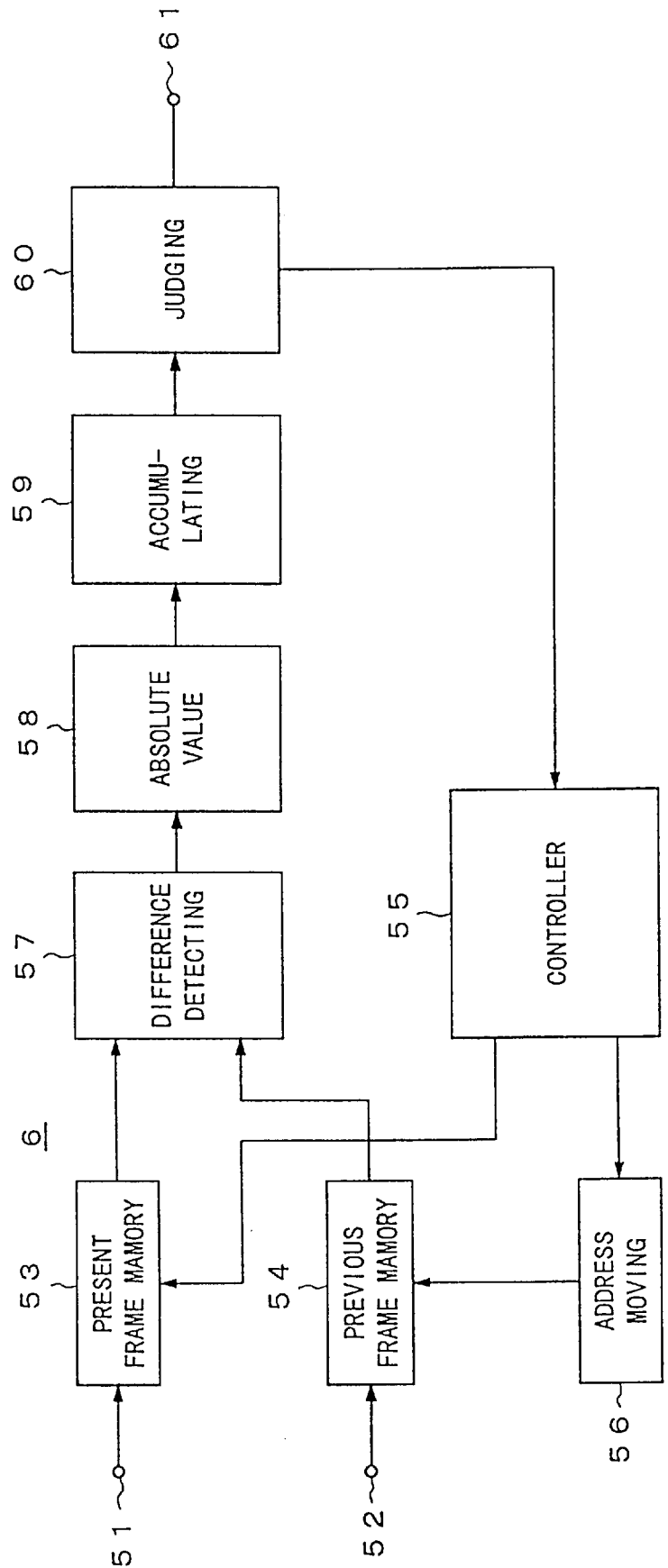
FIG. 9 is a block diagram of an example of a motion vector detecting circuit.

FIG. 9 shows a construction of an example of the motion vector detecting circuit 6. In FIG. 9, reference numeral 51 denotes an input terminal of the image data of the present frame. The image data is stored in a present frame memory 53. Reference numeral 52 denotes an input terminal of the image data of the previous frame and the image data is stored in a previous frame memory 54.

The reading/writing operations of the present frame memory 53 and previous frame memory 54 are controlled by a controller 55. Pixel data of the reference block of the present frame is read out from the present frame memory 53. Pixel data of the check block of the previous frame is read out from the previous frame memory 54. An address moving circuit 56 is provided in association with the previous frame memory 54. The controller 55 controls the address moving circuit 56, so that the position of the check block is changed within a search area by one pixel step by one.

An output of the present frame memory 53 and an output of the previous frame memory 54 are supplied to a difference detecting circuit 57, thereby detecting a difference (frame difference) of every pixel. An output of the difference detecting circuit 57 is converted to an absolute value by an absolute value forming circuit 58. The absolute value is supplied to an accumulating circuit 59. The accumulating circuit 59 accumulates the absolute value differences which occurred in one block. An output (frame difference absolute value sum) of the circuit 59 is supplied to a judging circuit 60 as an evaluation value. The judging circuit 60 detects the motion vector from the absolute value sum of the differences which occur when the check block is moved within the search area. That is, the position of the check block which causes the sum of the absolute values of the minimum differences is detected as a motion vector. The detected motion vector is extracted to an output terminal 61.

Figure 10:
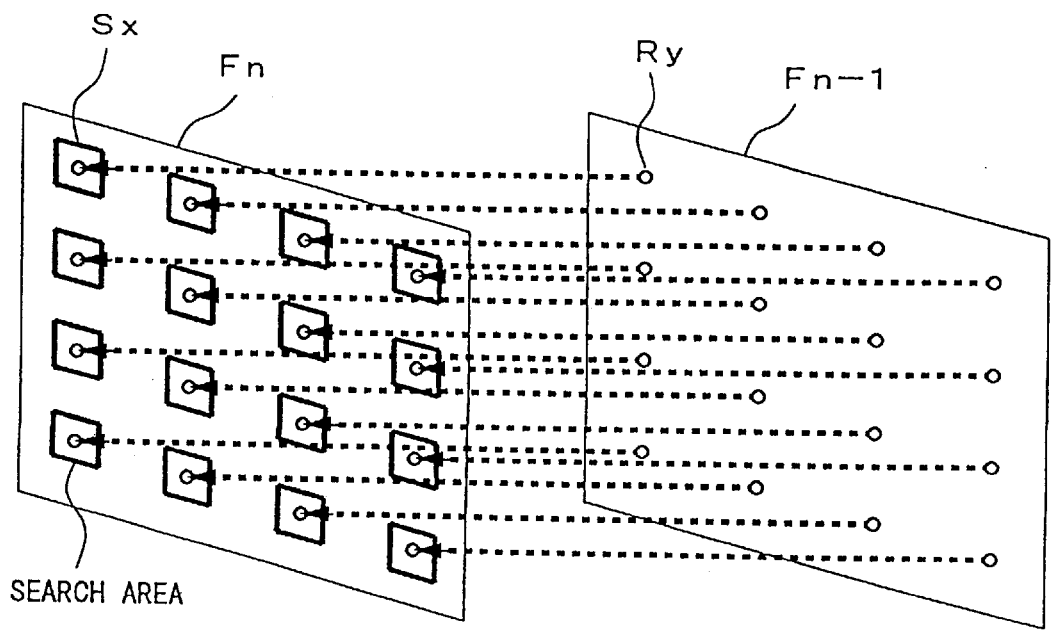
FIG. 10 is a schematic diagram for schematically explaining a camera shake motion vector detection.

According to the embodiment of the invention, the motion vector for motion compensation detected as mentioned above is also used to correct the camera shake. The motion vector for camera shake correction shows a motion of the whole picture plane or a relatively large block. As an existing method, as shown in FIG. 10, there has been known a method of detecting the motion vector for camera shake correction.

That is, the present frame Fn is divided into search areas Sx, thereby obtaining the absolute values of the frame differences between a plurality of pixels in each search area Sx and representative point pixel Ry (pixel at the center position of the search area) of the previous frame Fn−1. Further, the frame difference absolute values obtained in each search area Sx are integrated at the same spatial position, thereby forming an evaluation value table having the same size as that of the search area Sx. The minimum value in the evaluation value table is detected, thereby obtaining the motion vector of the whole picture plane.

As mentioned above, the motion vector to be obtained by the motion vector detecting circuit 6 is obtained on a block unit basis. On the other hand, the motion vector which is necessary to correct the camera shake is obtained by the whole picture plane or on a unit basis of a relatively large block. Since there is such a difference, the camera shake detecting circuit 12 receives the frame difference absolute value sum Pij and the motion vector Vhv from the motion vector detecting circuit 6 and forms the motion vector for camera shake correction.

Figure 11:
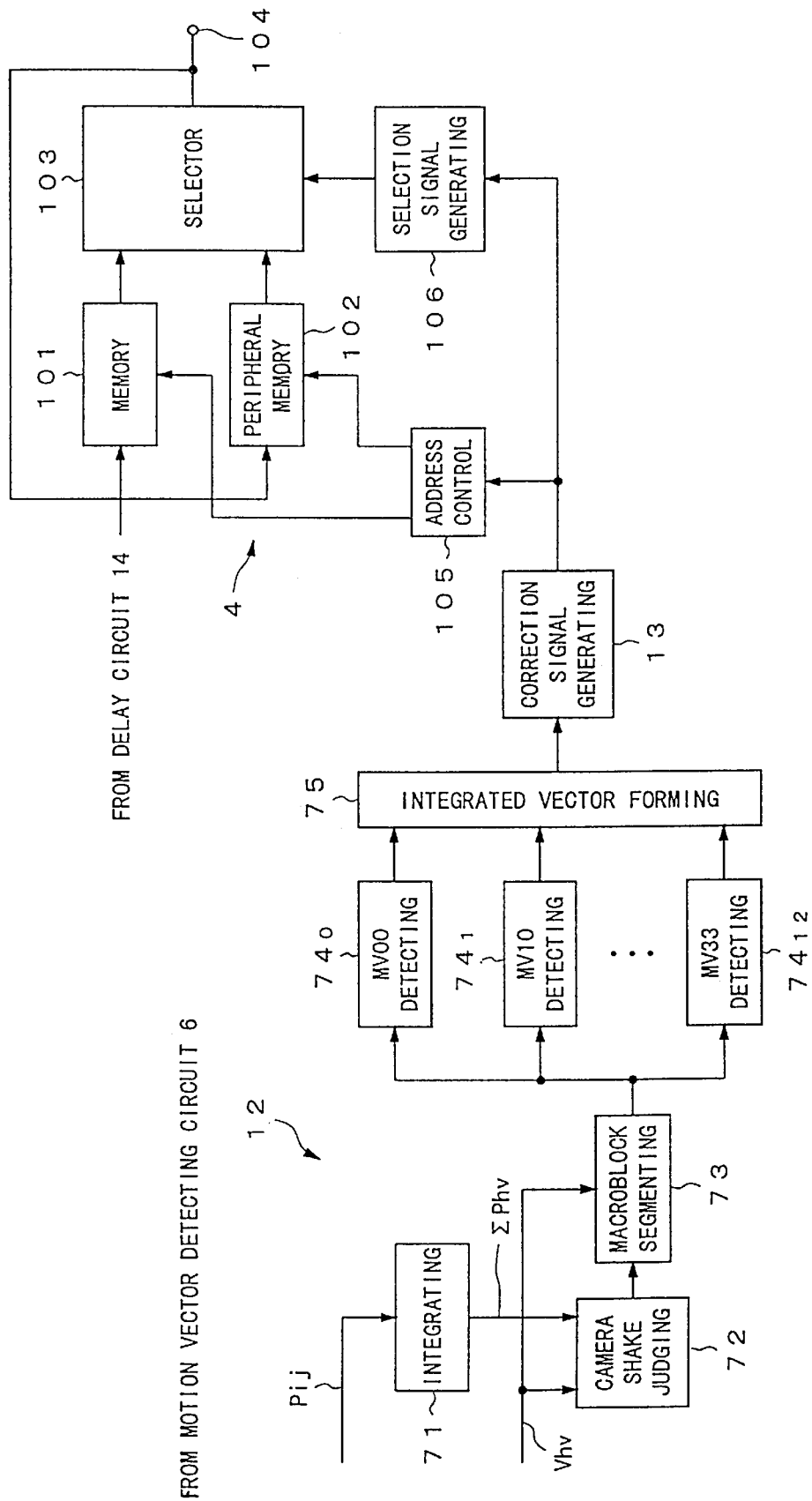
FIG. 11 a block diagram of an example of a camera shake correcting circuit and a camera shake detecting circuit.

FIG. 11 shows a construction of an example of the camera shake detecting circuit 12 and camera shake correcting circuit 4. The frame difference absolute value sum Pij from the motion vector detecting circuit 6 is supplied to an integrating circuit 71. The frame difference absolute value sum Pij will now be described with reference to FIG. 12. As described with reference to FIG. 8, the absolute value sum of the frame differences between the reference block Bx and check block By is calculated at each position of the check block By in the search area. As an example, now assuming that the search area is set to ±4 in the horizontal direction and ±3 in the vertical direction, the frame difference absolute value sum between the reference block and (9×7=63) check blocks is calculated.

FIG. 12 shows a state in which the frame difference absolute value sum with respect to one certain reference block Bx of the present frame is arranged in correspondence to the positions of the check blocks. A frame difference absolute value sum P43 at the center position (i=4, j=3) is the sum which is obtained when the reference block Bx and check block By exist at the spatial same position. The frame difference absolute value sum Pij is integrated by the integrating circuit 71 every reference block, thereby forming an evaluation value ΣPhv. As an example, it is now assumed that a block size is set to (16×16) and an effective picture plane size of one frame is set to (704 pixels×480 lines). As shown in FIG. 13, one frame is divided into (44×30) blocks, so that the evaluation values ΣPhv of the number that is equal to the number of blocks are obtained.

The evaluation value ΣPhv reflects a distribution of the levels of the images in the block. When the image in the search area has a flat level distribution, the level of the frame difference absolute value sum decreases and the level of the evaluation value ΣPhv also decreases. On the other hand, when the level distribution is not flat but includes an edge or the like, the level of the evaluation value ΣPhv also increases. In the embodiment, the level distribution of images is used as an activity. The flat level distribution is set to a low activity. The activity is not limited to a spatial inclination but also includes a frequency component or the like in the frequency conversion.

Figure 14:
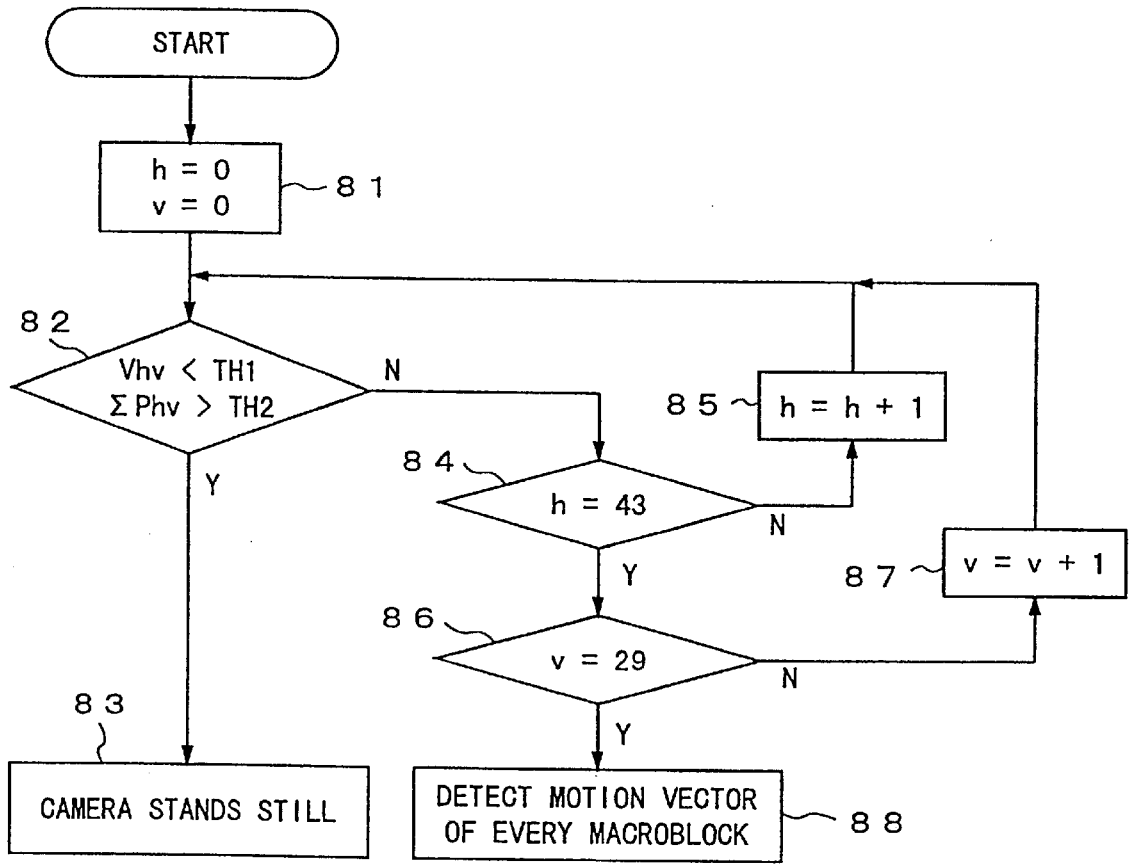
FIG. 14 is a flowchart which is used in an explanation of the detecting process of the camera shake motion vector.

The evaluation value 'Phv and the motion vector Vhv are supplied to a camera shake judging circuit 72. As shown in a flowchart of FIG. 14, the camera shake judging circuit 72 performs a camera shake judgment. As initial values, (h=0, v=0) are set (step 81) and Vhv and ΣPhv are respectively compared with threshold values TH1 and TH2 in step 82. When V00<TH1 and ΣP00>TH2, it is judged that the camera stands still (namely, there is no camera shake) (step 83).

When the conditions in step 82 are satisfied, it means that the block 00 corresponds to an image at a position in which the level change of the edge or the like is discontinuous (ΣP00>TH2) and it is detected that there is no motion with respect to the block 00 (V00<TH1). When the camera shake occurs, the whole picture plane moves. Therefore, when at least one still block exists, it can be judged that there is no camera shake.

When the conditions in step 83 are not satisfied, the processing routine advances to step 84 and a check is made to see if a value of h is the maximum value (43) in the horizontal direction. If NO, in step 85, the value of h is increased by +1 and the processing routine is returned to step 82. As mentioned above, a processing routine is shifted from the process with respect to the block 00 to an adjacent block 10 and whether the block 10 is a still block or not is judged. When the processes with respect to all of the blocks in which v=0 are finished, the processing routine advances from step 84 to step 86.

In step 86, whether a value of v is equal to 29 or not is determined. If NO, the processing routine advances to step 87. In step 87, the value of v is increased by +1 and the processing routine is returned to step 82. When the value of v reaches 29, the processes of all of the (44×33) blocks are completed. When no still block is detected with respect to all of the blocks, the motion of the whole picture plane, namely, the camera shake is judged. In step 88, the processing routine advances to a process for the motion vector detection every macroblock. In the construction of FIG. 11, a control signal of the judgment result is generated from the camera shake judging circuit 72 to a macroblock segmenting circuit 73.

Figure 15:
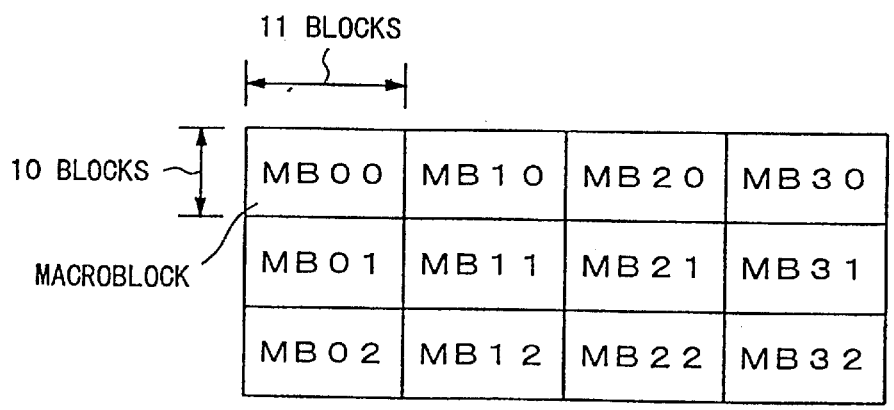
FIG. 15 is a schematic diagram showing an example of a process for dividing a picture plane into macroblocks.

The macroblock segmenting circuit 73 separates the motion vector Vhv from the motion vector detecting circuit 6 every macroblock. In this instance, as shown in FIG. 15, the picture plane of one frame is divided into four portions in the horizontal direction and is further divided into three portions in the vertical direction, thereby forming 12 macroblocks of a size of (11×10) blocks. In order to obtain a plurality of macroblocks, the method of dividing one picture plane is not limited to such an example of the macroblocks but various methods can be used. It is, however, necessary to generate the macroblocks which are not neighboring each other. Therefore, a method of dividing the picture plane into four equivalent portions must not be used. The motion vector is supplied to motion vector detecting circuits $74_0$, $74_1$, ..., and $74_{12}$ every macroblock.

The motion vector detecting circuit $74_0$ detects a synthesis motion vector MV00 by adding the motion vectors of the blocks included in a macroblock MB00. Similarly, the motion vector detecting circuits $74_1$, $74_2$, ..., and $74_{12}$ detect the synthesis motion vectors MV10, MV20, ..., MV32 of the macroblocks, respectively. The detected synthesis motion vector MV00 to MV32 are supplied to an integrated vector forming circuit 75.

The integrated vector forming circuit 75 generates the motion vector (integrated vector) of the whole picture plane by integrating the 12 synthesis motion vectors. The integrated vector is supplied to the correction signal generating circuit 13. The integrated vector is detected from the motion between the frames and is not the same as a correction amount of the camera shake. For example, for a period of continuous three frames, when the camera shakes in the same direction occur for the period of the second frame and the period of the third frame, an integrated vector V1 between the first frame and the next frame is obtained and an integrated vector V2 between the second and third frames is obtained. Although it is sufficient that a correction amount for the second frame is equal to V1, a correction amount for the third frame needs to be equal to (V1+V2). The correction signal generating circuit 13 generates a correction amount obtained by integrating the integrated vector as an example. A camera shake correction signal from the correction signal generating circuit 13 is supplied to the correcting circuit 4, thereby correcting the camera shake of the input image data.

Figure 16:
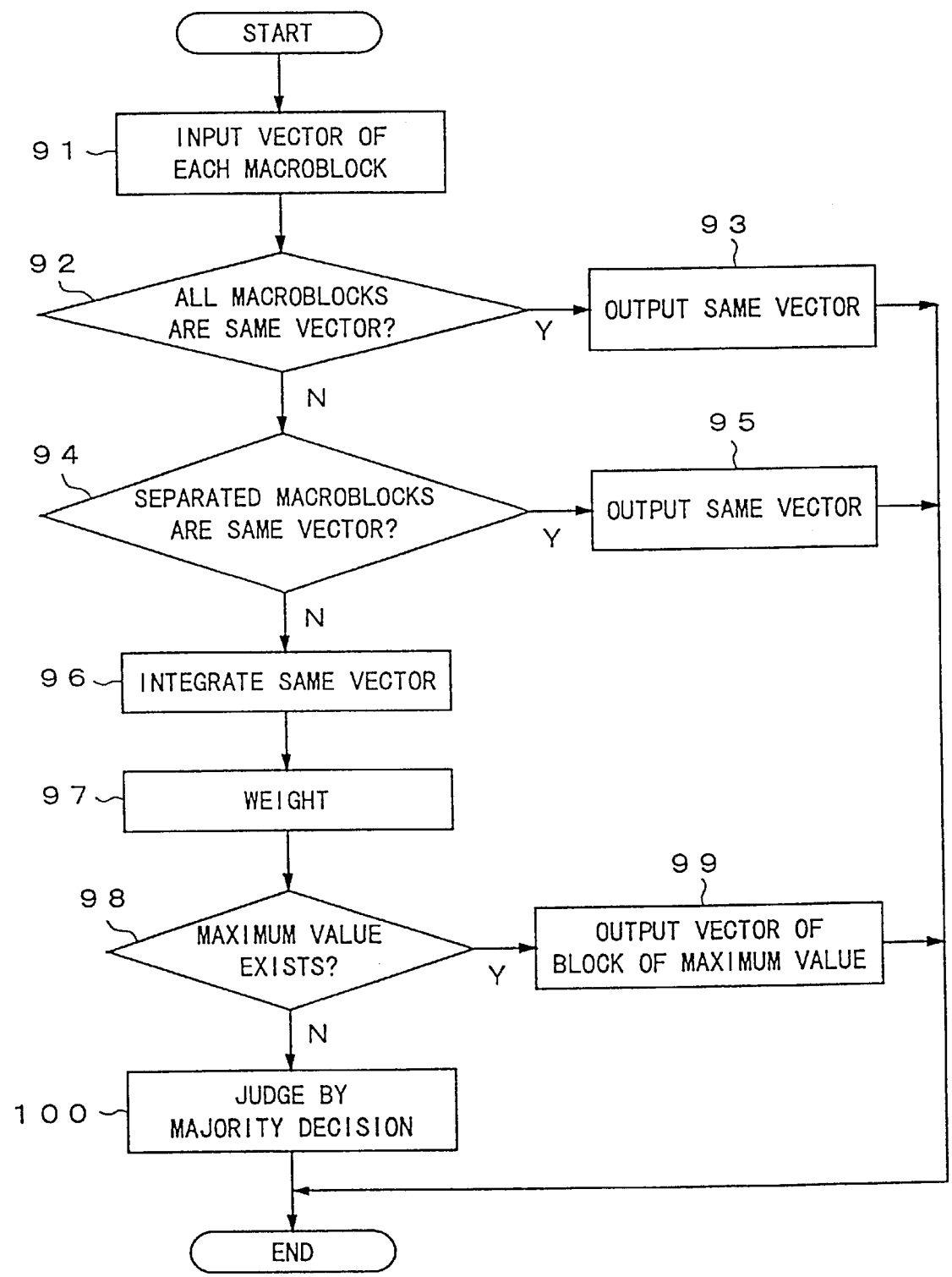
FIG. 16 is a flowchart showing the forming operation of an integrated vector in an embodiment of the invention.

The integrated vector forming circuit 75 forms the integrated vector in accordance with a flow shown in FIG. 16. The motion vector of each macroblock is inputted (step 91) and a check is made to see if the motion vectors of all of the macroblocks are the same (step 92). If YES, such a motion vector is outputted as an integrated vector (step 93). In a manner similar to the above, the term "same" includes a certain degree of tolerance.

When step 92 is not satisfied, the processing routine advances to judging step 94 and a check is made to see whether the motion vectors are the same with respect to a plurality of macroblocks which are spatially separated or not. In other words, a check is made to see whether the macroblocks having the same motion vector have spatially been separated in the whole one frame or not. The motion vector which satisfies step 94 is outputted as an integrated vector (step 95). The words "is spatially separated" means that the macroblocks [for example, (MB00, MB10, MB01, MB11)] which are neighboring in the vertical, lateral, and oblique directions are eliminated. Therefore, the number of macroblocks having the spatial distances and the same motion vector and the like are properly set in consideration of a necessary detecting precision or the like. An erroneous judgment such that a motion of an object of a relatively large area is regarded as a camera shake can be eliminated by the discriminating step 94.

If NO in step 94, step 96 follows and the numbers of macroblocks having the same vector are totaled. A weight is added to each number of the macroblocks in step 97. Such a weighting process is executed to give a priority to the number of blocks regarding the macroblocks in the peripheral portions of the picture plane than the number of blocks regarding the macroblocks near the non-peripheral portions of the picture plane. For example, a weight coefficient of 1.5 is multiplied to the number of blocks regarding the peripheral portions and a weight coefficient of 1 is multiplied to the number of blocks regarding the portions near the non-peripheral portions. The weighting process in step 97 is performed to the motion of the object of a relatively large area in consideration of a fact that a number of macroblocks exist near the center.

The processing routine advances to step 98 and a check is made to see if there is the maximum value among the weighted numbers of blocks. If YES, the motion vector of the macroblock of the maximum value is outputted as an integrated vector (step 99). If the numbers of blocks are equal or are almost equal, step 100 follows. With regard to the number of macroblocks, a majority decision is performed in step 100. The motion vector which has been judged as a majority is outputted as an integrated vector. The majority judgment has a problem in terms of a precision when the integrated vector is generated. In case of attaching importance to the precision, such a judgment is omitted and it is also possible to process by regarding such that the integrated vector cannot be detected.

By the above process, since the motion vector is integrated to the motion vector of the whole picture plane by using a difference between the characteristics of the motion object and the camera shake, the detected camera shake motion vector is not influenced by the motion of the target object in the picture plane, so that the motion vector has a high precision.

Explanation will now be made by returning to FIG. 11. The integrated vector indicative of the motion of the whole picture plane is supplied to the correction signal generating circuit 13 and a correction signal is formed by an integration. The correction signal is supplied to the camera shake correcting circuit 4 and the camera shake is corrected. The camera shake correcting circuit 4 comprises: a memory 101 in which image data from the delay circuit 14 is written; a peripheral memory 102; a selector 103 to select read outputs of the memory 101 and peripheral memory 102; an address control circuit 105 to control addresses in the memory 101 and peripheral memory 102; and a selection signal generating circuit 106 for generating a selection signal to control the selector 103. A video signal in which the camera shake has been corrected is taken out to an output terminal 104.

The memory 101 is, for example, a frame memory and its read address is controlled by the correction signal. Therefore, the image data moved in accordance with the correction signal is read out from the memory 101. The data selected by the selector 103 is written into the peripheral memory 102. In response to a selection signal from the selection signal generating circuit 106, the selector 103 selects the camera shake corrected image data from the memory 101 and the peripheral data stored in the peripheral memory 102.

Figure 17A:
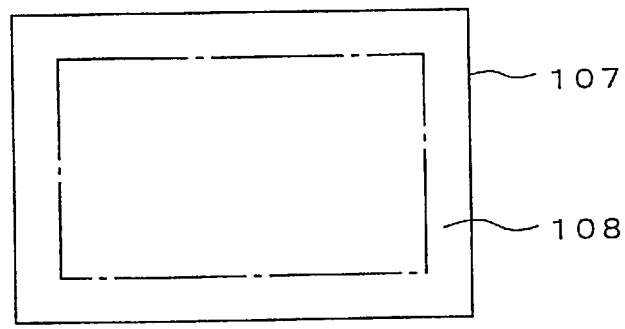
FIGS. 17A and 17B are schematic diagrams showing the camera shake correcting operation in the embodiment of the invention.
Figure 17B:
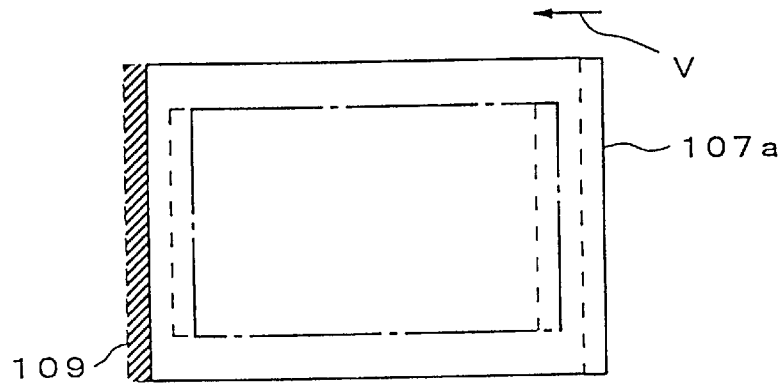

In FIG. 17A, a peripheral portion (region on the outside of an alternate long and short dash line) 108 of an image (shown by its picture frame 107) of one frame stored in the memory 101 is stored into the peripheral memory 102. A width of the peripheral portion 108 is set in consideration of a range of the camera shake correction. For example, it is set to a width of about 10 to 20% of the image of one frame in each of the horizontal and vertical directions. In FIG. 17B, as shown in a picture frame 107a, when the image which ought to be located at a position in FIG. 17A is moved, for example, to the right toward the drawing by the camera shake, the whole image is corrected to a position shown by a broken line on the basis of a camera shake correction amount V. In case of the camera shake correction, an image of a portion 109 which doesn't inherently exist and is shown by a hatched region on the left side of the image after the movement drops out in the photographed image. The image at the corresponding position stored in the peripheral memory 102 is substituted for the drop portion 109. Such a substitution is executed by an address control by the address control circuit 105 and the switching operation of the selector 103. The peripheral image data other than the drop portion 109 in the photographed image data is written into the peripheral memory 102. The contents in the peripheral memory 102 are updated.

As mentioned above, since the drop-out image which occurs due to the camera shake correction is replaced by the peripheral image stored in the peripheral memory, different from a process for enlarging the image, a deterioration of a resolution of the image can be prevented.

According to the embodiment of the invention mentioned above, the motion vector to detect the camera shake motion vector is obtained by processing the video signal before the camera shake correction. A process such as a motion compensation or the like is executed to the video signal which was camera shake corrected by the camera shake correcting circuit 4. Therefore, the motion compensation cannot be performed by the motion vector detected by the motion vector detecting circuit 6. To solve such a problem, the motion vector correcting circuit 15 is provided. Camera shake components included in the motion vector are eliminated by the motion vector correcting circuit 15.

Figure 18A:
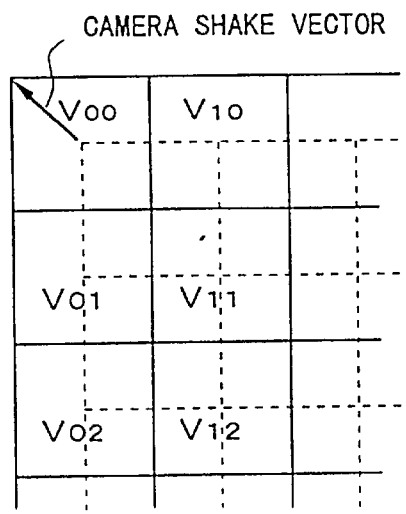
FIGS. 18A and 18B are schematic diagrams showing the correcting operation of the motion vector in the embodiment of the invention.

The process in the motion vector correcting circuit 15 will now be described with reference to FIGS. 18A and 18B. FIG. 18A shows that the motion vectors V00, V01, V10, V11, . . . , etc. obtained in each block include the camera shake vector components. When there is no camera shake, the positions of those blocks exist at the positions shown by broken lines.

Figure 18B:
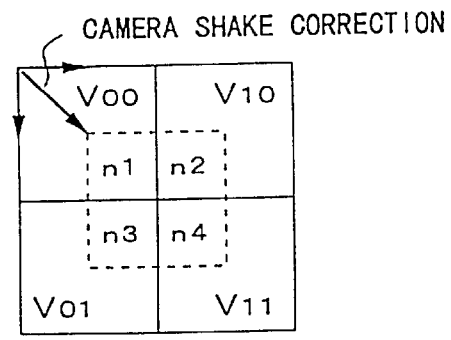

When paying attention to the block of the motion vector V00, as shown in FIG. 18B, when the camera shake components are eliminated, the position of this block exists at the position shown by the broken line. With respect to the block existing at the position of the broken line, the number of pixels included in the block at the position where the motion vector was detected and the number of pixels included in the other peripheral blocks are obtained. In FIGS. 18A and 18B, the whole number of pixels of the block is set to n and at the positions shown by broken lines, n1, n2, n3, and n4 indicate the numbers of pixels included in the blocks. A motion vector V00' after the correction is calculated by a weighted mean method shown by the following equation. The motion vectors of the other blocks are also corrected in a manner similar to that mentioned above.

$$V00' = (n1/n) \cdot V00 + (n2/n) \cdot V10 + (n3/n) \cdot V01 + (n4/n) \cdot V11$$

To obtain the numbers (n1 to n4) of pixels included in those plurality of blocks, a projection component to the x axis of the camera shake correction and a projection component to the y axis are used. The motion vector can be corrected as mentioned above. The weighted mean method is one of correcting methods. Another correcting method can be also used.

Figure 19:
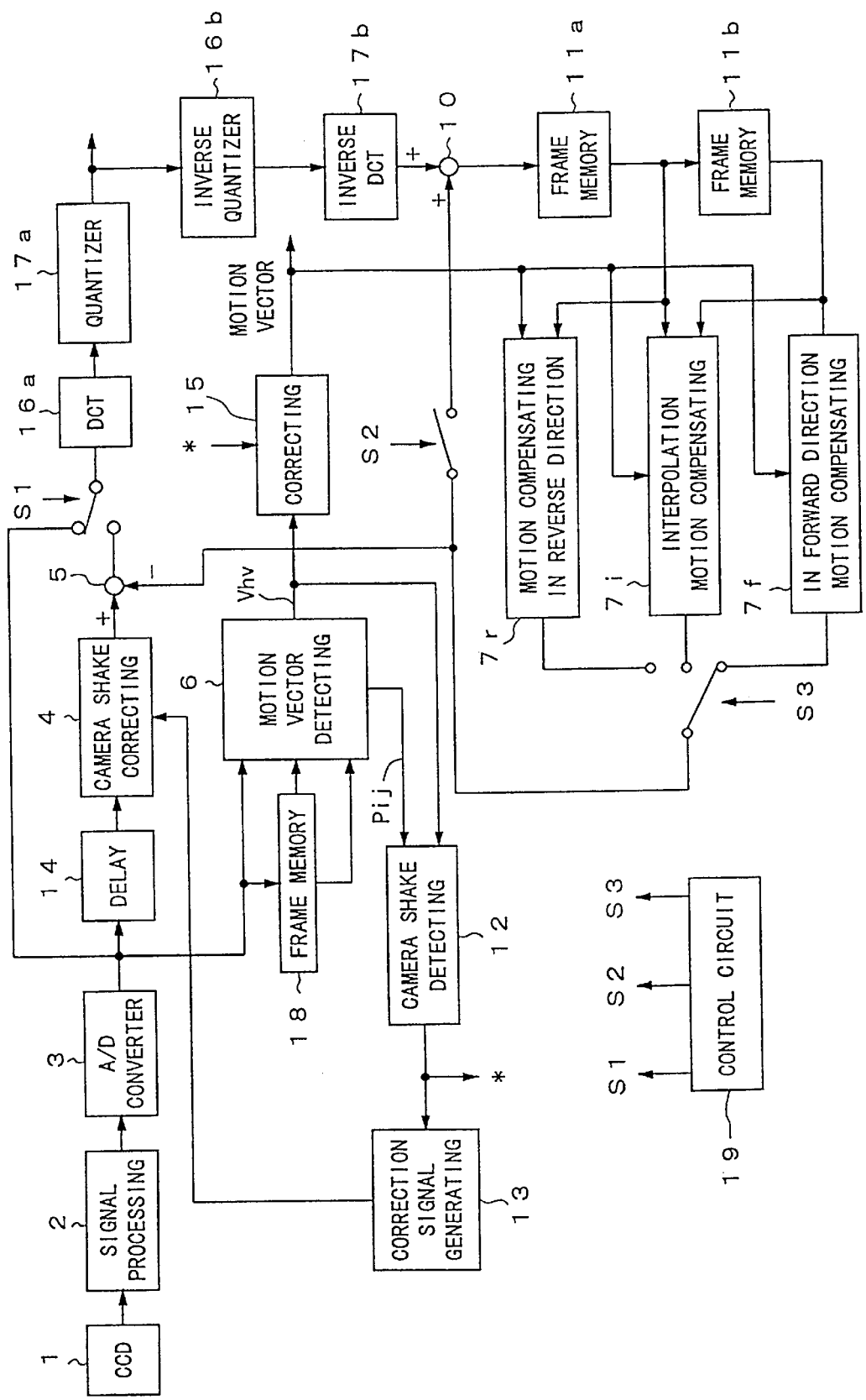
FIG. 19 is a block diagram of another embodiment of the invention.

FIG. 19 shows another embodiment of the invention. In the embodiment shown in FIG. 3, an interframe difference from the subtracting circuit 5 has been compressed by the ADRC. However, an encoding of the MPEG (Moving Picture Experts Group) standard is used in the other embodiment. According to the MPEG, a compression using a spatial correlation is executed by a DCT (Discrete Cosine Transform) circuit 16a and a quantizer 17a and a bidirectional motion compensation interframe prediction is executed.

The bidirectional predictive encoding comprises an intraframe predictive encoding, a forward direction predictive encoding, and a reverse direction predictive encoding. The forward direction predictive encoding is an interframe predictive encoding for predicting the present image from a past image. The reverse direction predictive encoding is an interframe predictive encoding for predicting the present image from a future image. Further, an interpolative interframe predictive encoding by the prediction in both of the front and back directions is also performed. In correspondence to those predictive encoding methods, picture types (I picture, P picture, B picture) are specified.

For the bidirectional motion compensation, a frame memory 18 is added to the motion vector detecting circuit 6. A motion compensating circuit 7r in the reverse direction, an interpolation motion compensating circuit 7i, and a forward direction compensating circuit 7f execute respective motion compensating processes by using the past, present, and future predictive images from frame memories 11a and 11b, respectively. An inverse quantizer 16b, an inverse DCT circuit 17b, and an adding circuit 10 for adding outputs of the inverse DCT circuit 17b and a signal transmitted through a switching circuit are provided for a local decoding. A switching circuit for selecting either one of a difference signal from the subtracting circuit 5 and a signal which is transmitted without passing through the subtracting circuit 5 is provided. Those switching circuits are controlled by control signals S1, S2, and S3 in accordance with the picture types mentioned above. The control signals S1, S2, and S3 are generated from an encoding control circuit 19.

According to the other embodiment of the invention, in a manner similar to the foregoing embodiment, the motion vector Vhv from the motion vector detecting circuit 6 and the evaluation value Pij are supplied to the camera shake detecting circuit 12, a camera shake motion vector is obtained and supplied to the correction signal generating circuit 13, and a correction signal is formed and supplied to the camera shake correcting circuit 4, thereby correcting the camera shake. To correct the camera shake motion vector, the motion vector correcting circuit 15 is provided.

Figure 20:
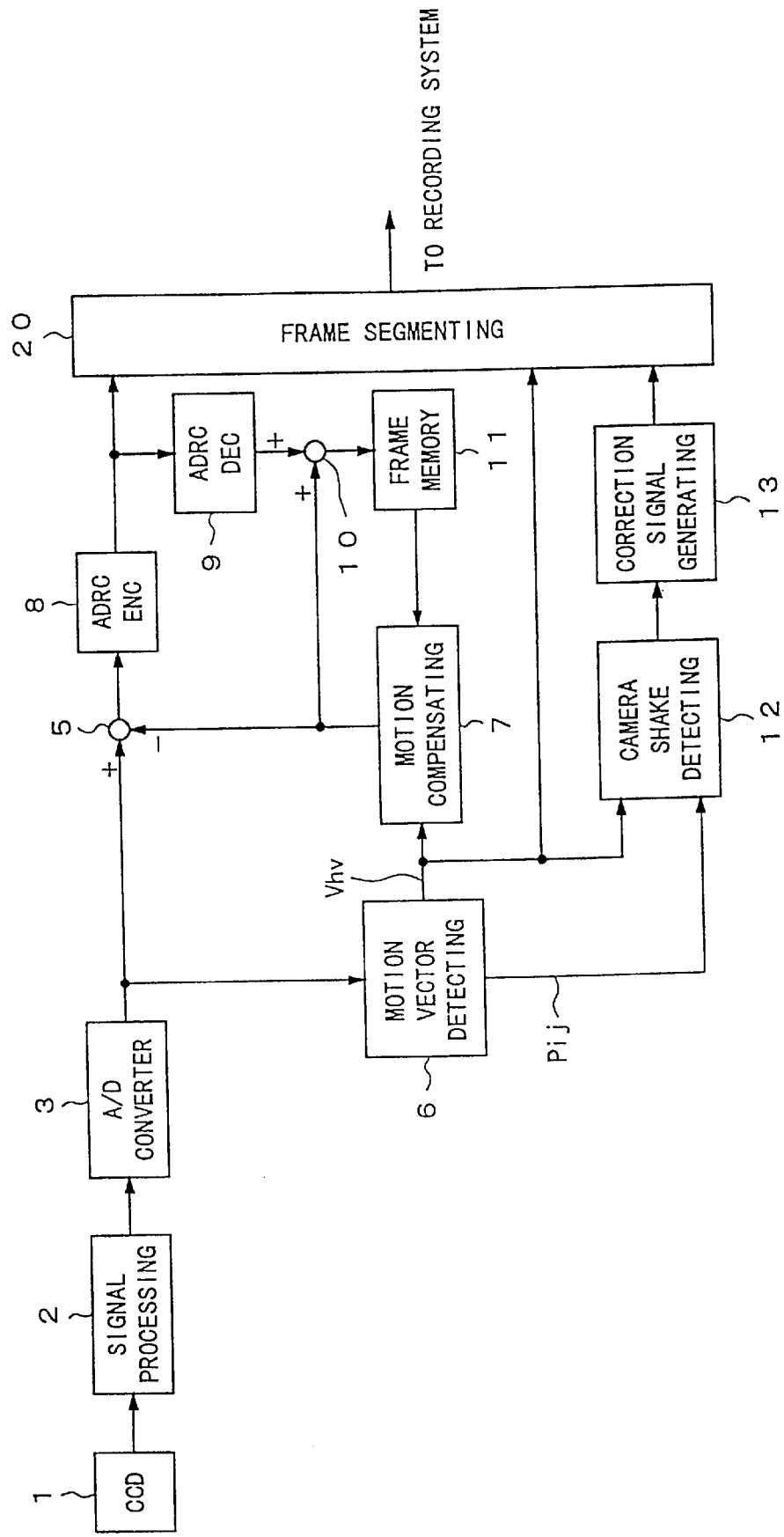
FIG. 20 is a block diagram of a recording system of still another embodiment of the invention.

FIG. 20 shows a construction on the recording side of further another embodiment of the invention. In this embodiment, the correction signal for a camera shake correction is generated on the recording side and the camera shake correction is performed on the reproducing side shown in FIG. 21. Therefore, as shown in FIG. 20, although the camera shake detecting circuit 12 and correction signal generating circuit 13 are provided on the recording side, the camera shake correcting circuit 4 is not provided. An encoded output from the ADRC encoder 8, the motion vector, and the camera shake correction signal are supplied to a frame segmenting circuit 20, so that recording data is formed. The recording data is recorded onto a recording medium through the recording system.

Figure 21:
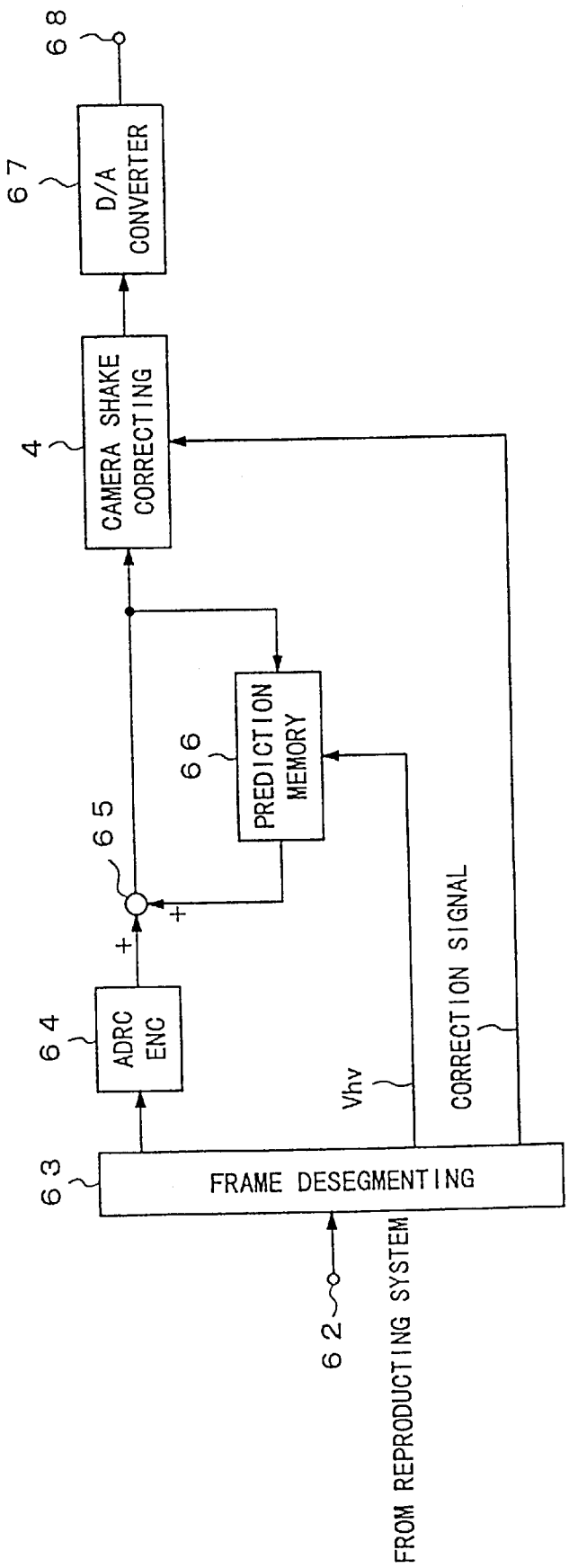
FIG. 21 is a block diagram of a reproducing system of further another embodiment of the invention.

As shown in FIG. 21, on the reproducing side, the reproduction data formed by the reproducing system is supplied from an input terminal 62 to a frame desegmenting circuit 63, by which an ADRC encoded output, the camera shake vector Vhv, and the correction signal are separated. The difference signal is decoded by an ADRC decoder 64 and a decoded difference signal is supplied to an adding circuit 65. An output of the adding circuit 65 is supplied to a prediction memory 66 and a motion compensation similar to that on the recording side is performed by the motion vector Vhv.

The reproduction image signal from the adding circuit 65 is supplied to the camera shake correcting circuit 4. The camera shake correcting circuit 4 executes the camera shake correction by the correction signal separated from the reproduction signal. The digital image signal from the camera shake correcting circuit 4 is supplied to a D/A converter 67 and the reproduction image signal is taken out to an output terminal 68. It is also possible to provide selecting means for selecting either one of a mode to make the camera shake correction operative and a mode to make it inoperative. Although the camera shake correction signal has been recorded in the embodiment, in place of the camera shake correction signal, it is also possible to record an evaluation value ΣPij and to form the camera shake correction signal by using the motion vector and the evaluation value on the reproducing side.

The further other embodiment of the invention in which the camera shake correction signal has been recorded can be also applied to the case of using the MPEG.

Although the peripheral memory has been provided to compensate the drop-out of the images upon camera shake correction, the drop-out of the images can be also compensated by a background memory. The background memory is a memory in which images which hardly change in a change in image between the frames are selectively written. By using the background memory, an uncovered background when executing the motion compensation can be prevented or a transmission data amount can be compressed by thinning out the background data to be transmitted. The compression encoding method according to such a method has been proposed by the inventors et al. of the present invention and disclosed in, for example, JP-B-7-97754. By using a memory having a capacity larger than that of the frame memory as a background memory, it can be used to accumulate images such as peripheral image due to the camera shake, image by a pan or a tilt, and the like which cannot be enclosed in one frame.

Figure 22:
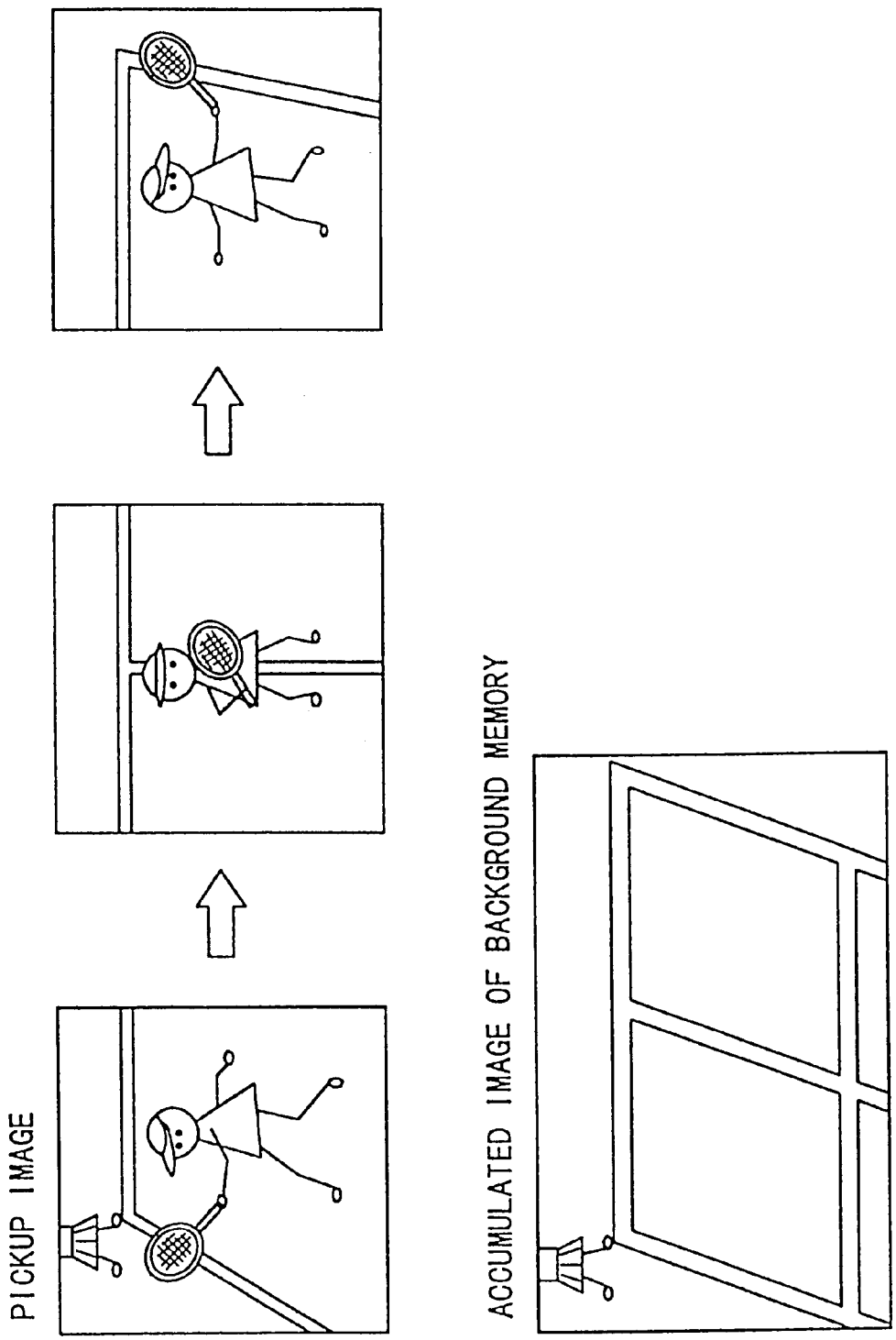
FIG. 22 is a schematic diagram which is used for a schematic explanation of a background memory which is used in further another embodiment of the invention.

FIG. 22 is a diagram for schematically explaining the image data to be accumulated into the background memory and shows that, for example, when a tennis player who plays on a court is photographed, an image which sequentially changes and a background image (specifically speaking, tennis court) in the photographed image are accumulated into the background memory. That is, the image excluding the moving player is accumulated in a wide range in the background memory.

Figure 23:
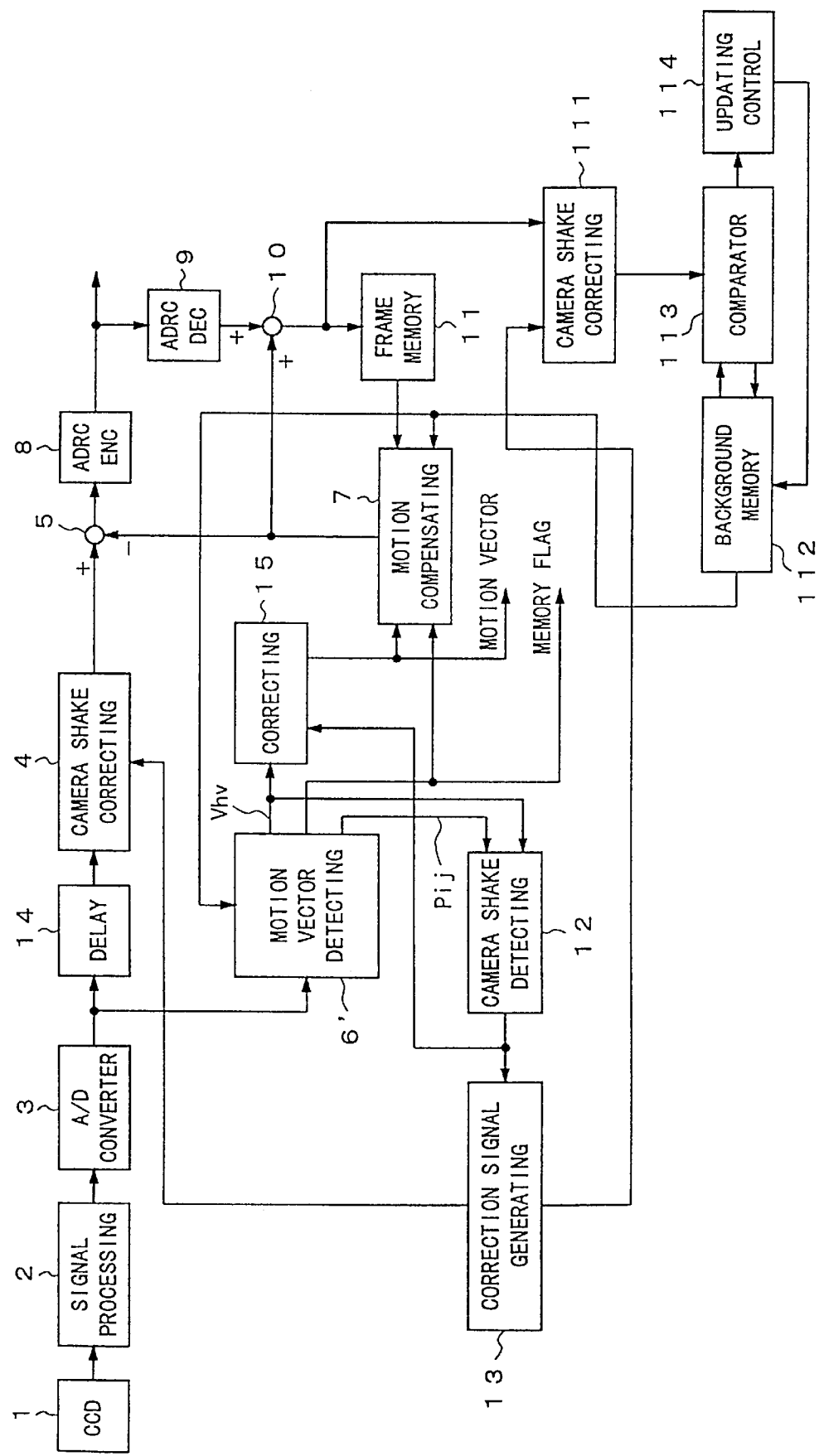
FIG. 23 is a block diagram of further another embodiment of the invention.

FIG. 23 is a diagram showing further another embodiment of the invention using the background memory. In FIG. 23, the component elements corresponding to those in the embodiment shown in FIG. 3 are designated by the same reference numerals and their descriptions are omitted. The image signal which was local decoded and motion compensated is inputted from the adding circuit 10 to a camera shake correcting circuit 111. The camera shake correcting circuit 111 executes the camera shake correction, for example, on a block unit basis. Namely, for example, the block position is corrected by the camera shake correction signal from the correction signal generating circuit 13. The image signal which is generated from the camera shake correcting circuit 111 is inputted to a background memory 112 through a comparator 113.

On the other hand, the image data at the position corresponding to the corrected block position is read out from the background memory 112. The comparator 113 calculates a difference value between the block including the local decoded image data and the image data at the corresponding position from the background memory 112 every pixel. The absolute value of the difference value is accumulated in one block. The accumulated value of the differences of the blocks is compared with a predetermined threshold value by the comparator 113. A comparison output of the comparator 13 is inputted to an updating circuit 114.

When the accumulated value of the differences is smaller than the threshold value, the updating control circuit 114 judges that the block is a block of a background image. When the block is decided to be the block of the background image, the data in the background memory 112 at the position corresponding to such a block is updated by the image block data. Upon updating, it is desirable to gradually update the contents in the background memory 112 rather than the case of updating the data in a lump. When the accumulated value of the differences is equal to or larger than the threshold value, it is determined that the data of the block includes the image information other than the background image and is not used for updating of the contents in the background memory 112. Further, when a memory of a capacity larger than that of the frame memory is used as a background memory 112 as shown in the example of FIG. 22, new background data which is not filled with the data of the frames of up to the previous frame is sequentially accumulated.

By performing the motion compensation by selectively using the data accumulated in the background memory 112 as mentioned above and the data in the ordinary frame memory, the dropped images can be compensated. The image data in the background memory 112 is supplied to a motion vector detecting circuit 6' with a construction shown in FIG. 24.

For the construction having the motion vector detecting circuit 6 shown in FIG. 9 mentioned above, a difference detecting circuit 57', an absolute value forming circuit 58', and an accumulating circuit 59' are provided. An output of the accumulating circuit 59' is supplied to a judging circuit 60' together with an output of the accumulating circuit 59. The judging circuit 60' outputs a motion vector and a memory flag to output terminals 61 and 61', respectively.

The difference detecting circuit 57' detects a difference of the pixel data at the same position between the output data of the background memory 112 and the output data of the present frame memory 53. The difference value is converted into an absolute value by the absolute value forming circuit 58' and is accumulated by the accumulating circuit 59'. The judging circuit 60' receives an accumulation output (accumulated value of the differences between the present frame and the previous frame) from the accumulating circuit 59 and the foregoing accumulation output from the accumulating circuit 59'. The judging circuit 60' outputs a more proper motion vector to the output terminal 61 on the basis of one accumulated output. The judging circuit 60' outputs the memory flag indicative of the selected one of the two accumulated outputs to the output terminal 61'.

As shown in FIG. 23, the motion vector is supplied to the motion compensating circuit 7 through the motion vector correcting circuit 15. The memory flag is supplied to the motion compensating circuit 7. The motion vector and the memory flag are transmitted or recorded together with the encoded data. One of the image data accumulated in the frame memory 11 and the background image data accumulated in the background memory 112 is selected by the memory flag. A motion compensating process is executed to the selected image data.

Although the encoder side in the foregoing further other embodiment has been described above, the background memory is also provided on the decoder side and either one of the image in the frame memory and the image in the background memory is selected in accordance with the memory flag in a manner similar to the decoder side.

According to the invention, since the camera shake motion vector is detected from the motion vector formed for motion compensation, a scale of the hardware can be reduced.

The present invention is not limited to the foregoing embodiments but many modifications and variations are possible within the spirit and scope of the appended claims of the invention.

What is claimed is:

1. An image signal recording apparatus having functions for
    dividing image data of one picture plane into a plurality of blocks,
    detecting a motion vector corresponding to a position of the block which most coincides from the image data which is one or a few frames before with respect to each block, and
    compressing the image data by using said motion vector, comprising:
    means for detecting the motion vector of each block;
    means for detecting a camera shake motion vector from the motion vector of each of said blocks;
    means for performing a motion compensation by said motion vector; and
    means for executing a compressing process by input image data and the image data which was motion compensated,
    wherein said camera shake motion vector is recorded together with said compressed image signal.

2. An apparatus according to claim 1, wherein said motion vector detecting means comprises:
    input image information memory means to which present image data is inputted;
    first comparison image information memory means in which the image data of one or a few frames before has been accumulated;
    second comparison image information memory means in which background image data existing in a plurality of frames has been stored;
    first means for detecting the motion vector by said present image data and said previous image data;
    second means for detecting the motion vector by said present image data and said background image data; and
    means for selecting the motion vector having smaller error data in said two detected motion vectors and for outputting said motion vector together with a memory instruction flag indicative of either one of the first and second comparison image information memory means corresponding to said selected motion vector.

3. An image signal recording apparatus having a functions for
    dividing image data of one picture plane into a plurality of blocks,
    forming an evaluation value table based on a difference between the present image data and the image data of the block which is one or a few frames before every pixel with respect to each block,
    detecting coordinates of a minimum value in said evaluation value table,
    detecting a motion vector on the basis of said coordinates, and
    compressing the image data by using said motion vector, comprising:
    means for detecting a camera shake motion vector from said evaluation value table and said motion vector;
    means for performing a motion compensation by said motion vector; and
    means for executing a compressing process by said input image data and the image data which was motion compensated, and wherein said camera shake motion vector is recorded together with said compressed image signal.

4. An image signal reproducing apparatus for reproducing the image data recorded by the image signal recording apparatus according to claim 3, comprising:

means for separating a reproduction signal into said compressed image data and said camera shake motion vector;

decoding means for decoding said compressed image data; and means to which the decoded image signal from said decoding means is supplied and which executes the camera shake correction by said camera shake motion vector.

5. An image signal reproducing apparatus for dividing image data of one picture plane into a plurality of blocks, detecting a motion vector corresponding to a position of the block which most coincides from the image data which is one or a few frames before with respect to each block, compressing the image data by using said motion vector, detecting a camera shake motion vector from said motion vector, performing a motion compensation by said motion vector, executing a compressing process by input image data and the image data which was motion compensated, and reproducing a recording medium on which said camera shake motion vector has been recorded together with said compressed image signal and said motion vector, comprising:

means for separating a reproduction signal into said compressed image signal, said motion vector, and said camera shake motion vector;

decoding means for decoding said compressed image data by using said motion vector; and means to which a decoded image signal from said decoding means is supplied and which executes a camera shake correction by said camera shake motion vector.

6. An apparatus according to claim 5, further having:

first image information memory means to which said decoded image data to be subjected to the camera shake correction is inputted;

second image information memory means in which peripheral image data of a frame in said decoded image has been accumulated; and selecting means for selecting one of the image data outputted from said first and second image information memory means in accordance with said camera shake motion vector.

7. An image signal reproducing apparatus for reproducing the image data recorded by the image signal processing apparatus according to claim 5, wherein said decoding means is constructed by first image information memory means in which the image data of one or a few frames before has been stored, second image information memory means in which background image data existing in a plurality of frames has been accumulated, and means for selecting either one of said first and second image information memory means in accordance with said image memory instruction flag and executing the motion vector correction.

8. An apparatus according to claim 7, wherein said camera shake correcting means selects and outputs the decoded image data to be subjected to the camera shake correction and the background image data which is obtained from said second image information memory means in accordance with said camera shake motion vector.

9. An image signal recording method having functions for dividing image data of one picture plane into a plurality of blocks, detecting a motion vector corresponding to a position of the block which most coincides from the image data of one or a few frames before with respect to each block, and compressing the image data by using said motion vector, comprising the steps of:

detecting the motion vector of each block;

detecting a camera shake motion vector from the motion vector of each of said blocks;

performing a motion compensation by said motion vector; and executing a compressing process by input image data and the motion compensated image data, wherein said camera shake motion vector is recorded together with said compressed image signal.

10. An image signal reproducing method of dividing image data of one picture plane into a plurality of blocks;

detecting a motion vector corresponding to a position of the block which most coincides from the image data of one or a few frames before with respect to each block, compressing the image data by using said motion vector, detecting a camera shake motion vector from said motion vector, performing a motion compensation by said motion vector, executing a compressing process by input image data and the motion compensated image data, and reproducing a recording medium on which said camera shake motion vector has been recorded together with said compressed image signal, comprising the steps of:

separating said compressed image signal and said camera shake motion vector from a reproduction signal;

decoding said compressed image data; and supplying the decoded image signal from said decoding step and executing a camera shake correction by said camera shake motion vector.

* * * * *